United States Patent Office 3,182,778
Patented May 11, 1965

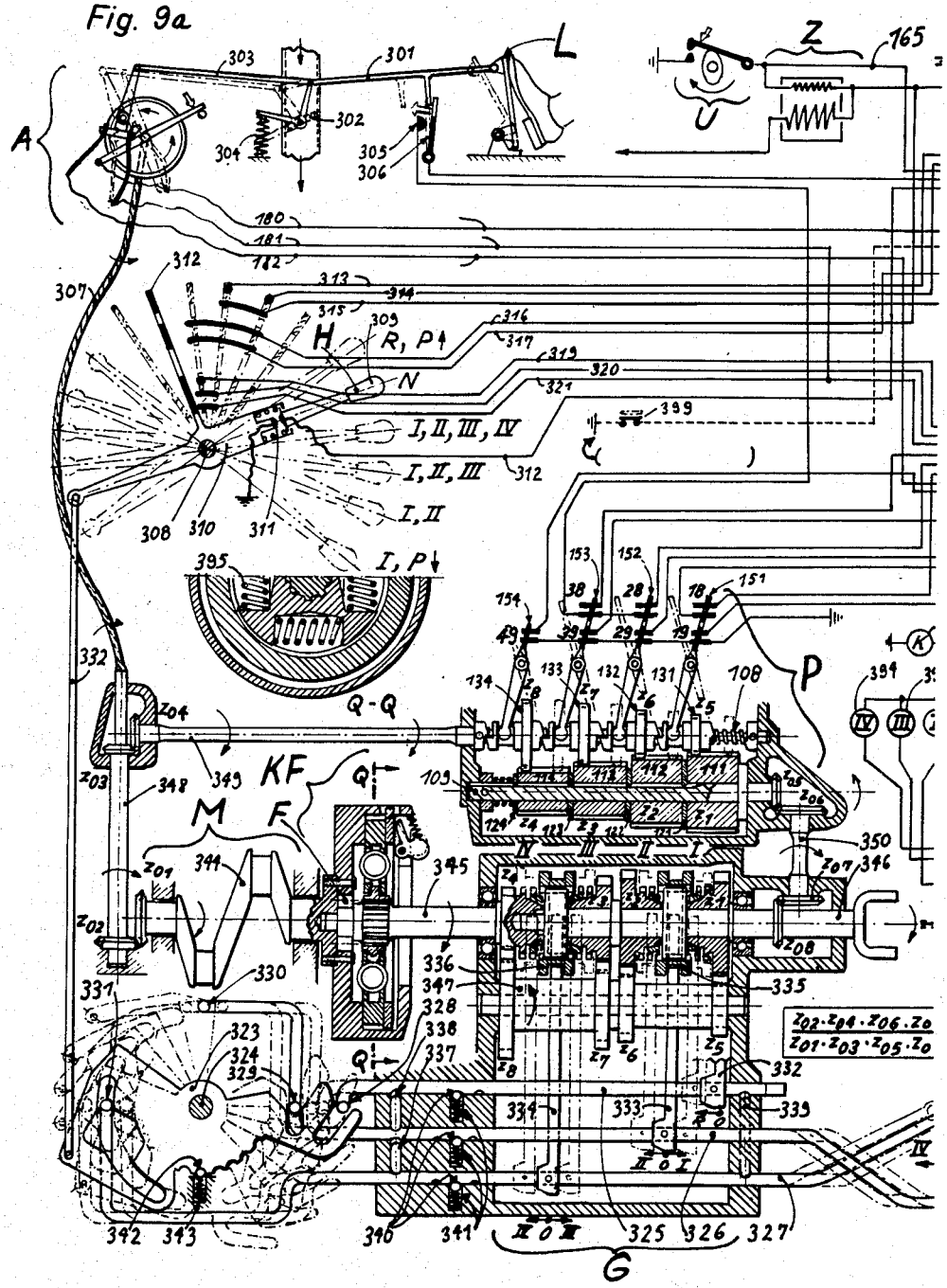

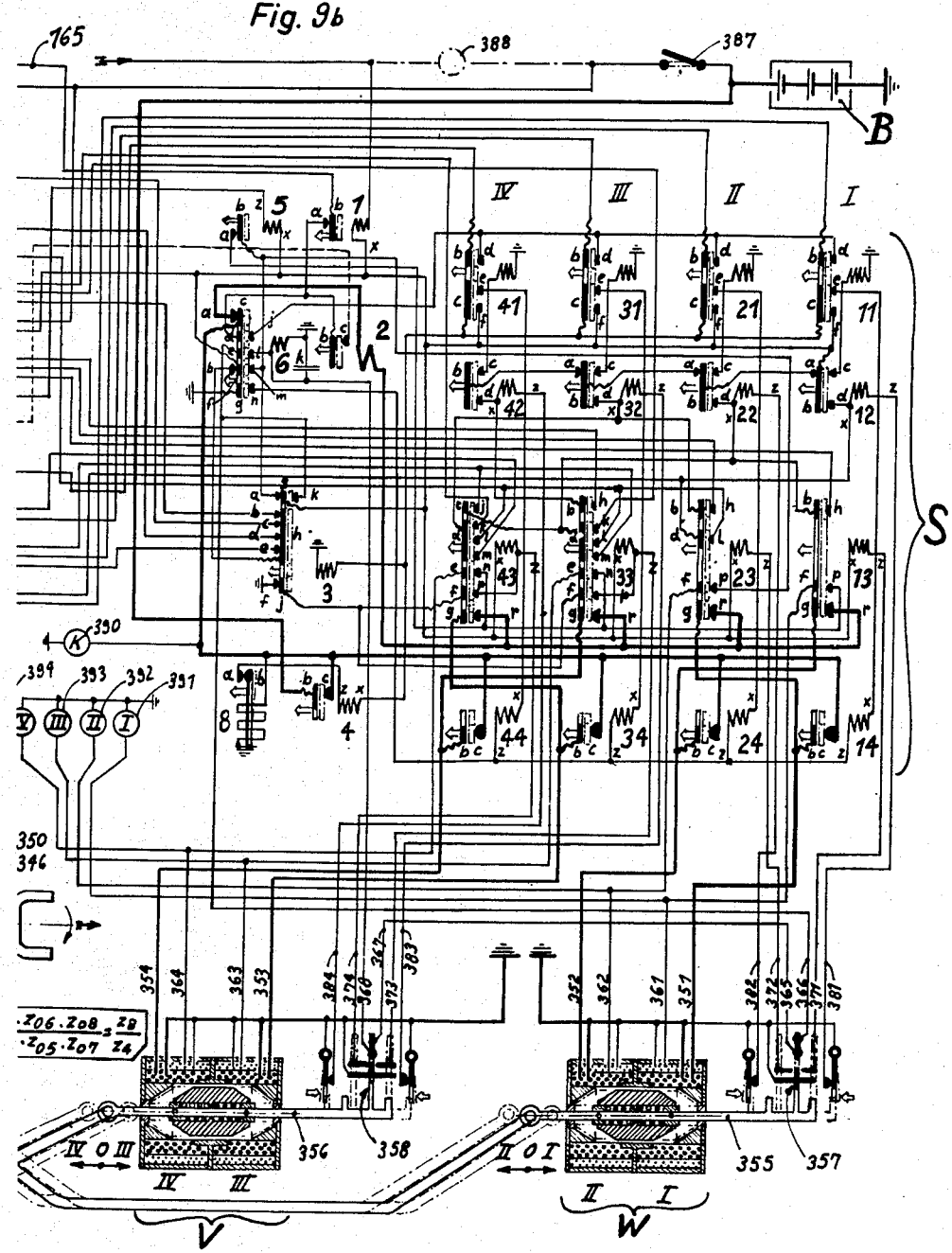

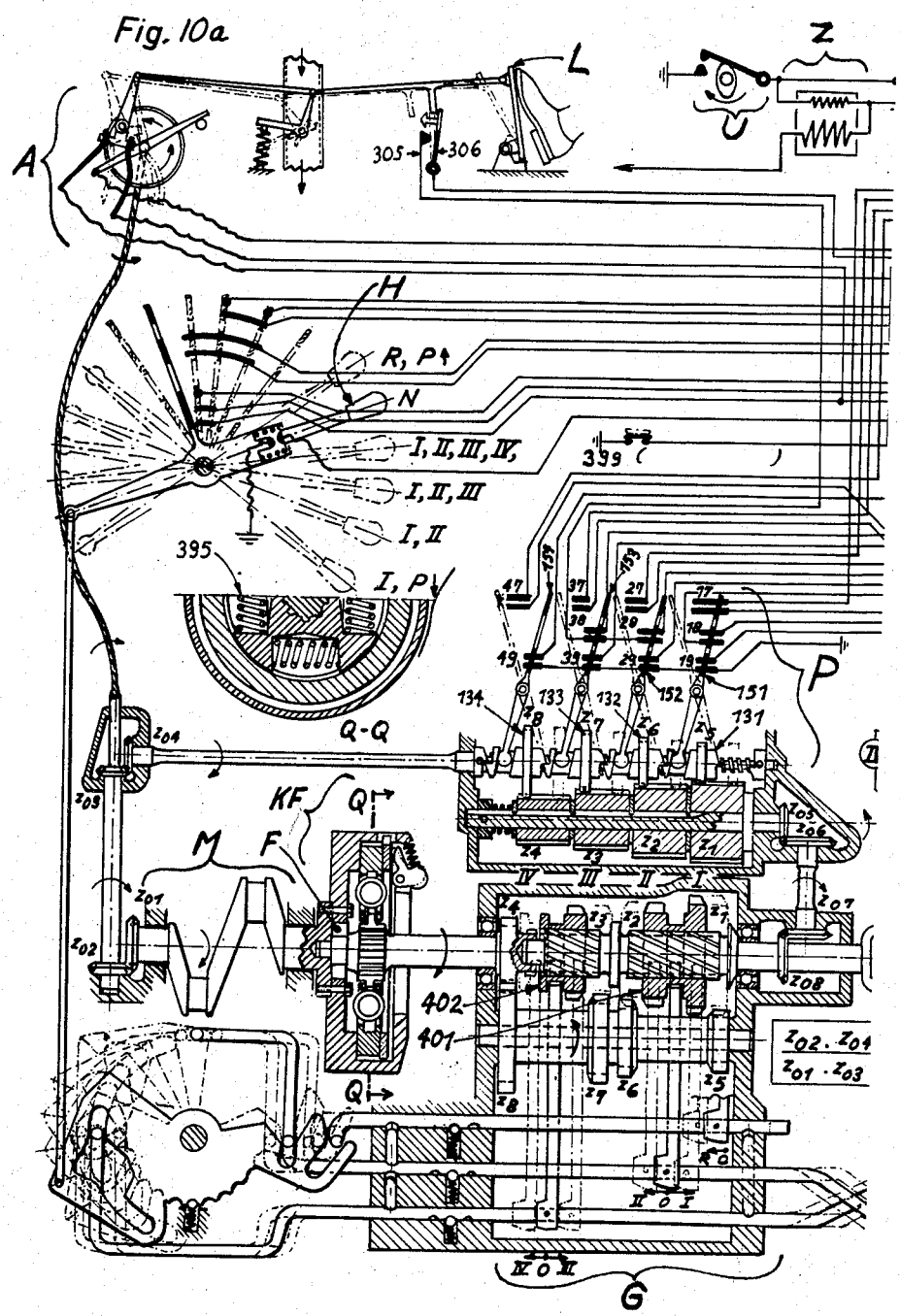

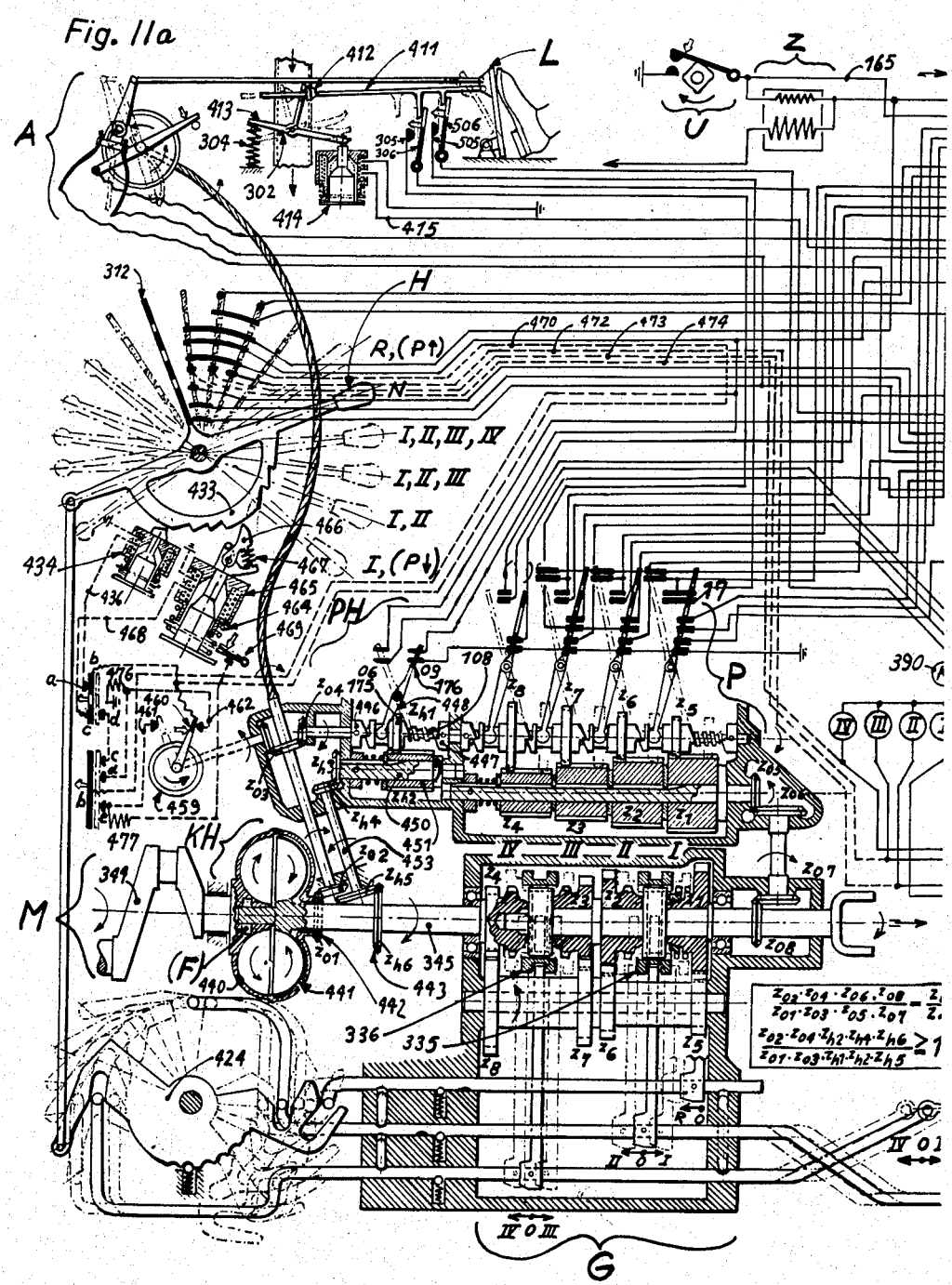

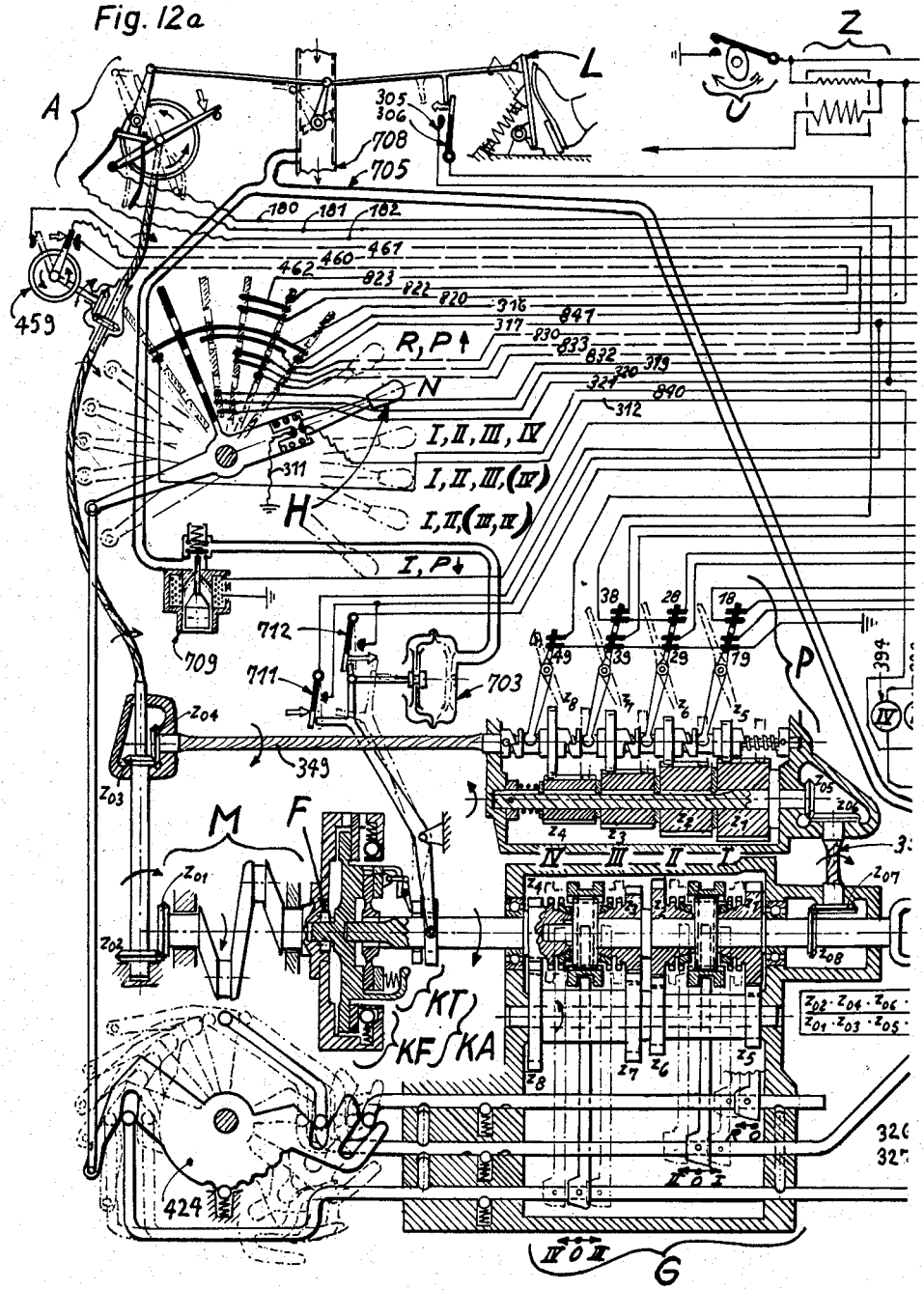

3,182,778
APPARATUS FOR AUTOMATIC CHANGING AND SHIFTING OF GEAR TRANSMISSION OF POWER UNITS, PARTICULARLY OF MOTOR VEHICLES
Helmut Dröschel, Russelsheim (Main), Germany (Uhlandstr. 18, Beilstein, Wurttemberg, Germany)
Filed May 2, 1961, Ser. No. 139,021
Claims priority, application Germany, May 5, 1960, D 33,270
7 Claims. (Cl. 192—.092)

The present invention relates to an apparatus for automatically changing the gears of change-speed gear systems in power transmissions, particularly in motor vehicles, and to components of such systems and their interaction, while also taking into consideration starting, coasting and stopping conditions of the vehicle and the possibility of changing gears down manually, as well as the most favorable design of the change-speed gear system.

For automatic shifting of a change-speed gear system of substantially standard construction the following essential components are required.

One of several initiating devices to initiate the gear-changing operation and the proper moment.

A regulating device which regulates the vehicle engine during the gear-changing operation as accurately as possible to run at the speed required for engaging the respective gear without a jerk.

Gear-changing servo devices which engage or disengage the sliding gears or sliding sleeves of the gear-changing system during the gear shifting process.

A program control fixture which completes the initiated gear shift in the required sequence.

In order to keep the various operations of these devices clearly separated, the term "initiating" is restricted to the initiation of a gear change from one gear step to another, the term "regulating" to the regulation of the engine speed, and the term "controlling" to operations not indicated by the terms "initiating" or "regulating."

*Regulation by means of parallel gear drive*

It is an object of the present invention to regulate the engine speed during the gear-changing process in such a manner that the respective gear may be shifted without producing a jerk, the object is achieved by employing a regulating device which takes its speed from the engine crankshaft and from the output shaft of the change-speed gear, and establishes a certain speed ratio between these two speeds by influencing the output of the engine, for example an Otto engine, by cutting out the ignition.

The said regulating device is based on the known principle that the relative rotation between a threaded nut and a threaded shaft results in a longitudinal movement of one of the two parts involved. In driving systems of motor vehicles the application of this principle for other purposes is known, for example for the purpose of driving a vehicle very slowly (German Patent 624,416, claim 15, FIG. 10), where a definite, controlled slip of the clutch of the driving unit is used in which the throwout lever of the clutch is electrically controlled by means of electrical contacts which are in turn controlled by means of an arrangement based on the above named principle using an additionally provided small friction clutch.

Another, more recent application applying the same principle (German Patent 933,076) employs the same arrangement as described above. It is used to actuate a valve shaft for the purpose of regulating the pressure in an oil line.

Apart from serving a different purpose both these known designs have the disadvantage that they can only be applied to one speed ratio. Since a change-speed gear always has several different forward speeds, generally from three to five, and since therefore a respective number of varying speed ratios must be included if the regulating device is to be used for such a purpose, a change-speed gear embodying in its structure the two known operating principles would also require from three to five individual embodiments of the respective principle. Though this would permit the determination or regulation of the speed ratios of the various speed steps, the required effort would be much too large.

It is an object of the present invention to overcome these disadvantages by providing parallel to the change-speed gear a second, similar gear system of small size, a "parallel gear," having the same gear wheel sets and the same gear wheel ratios as the actual change-speed gear, in which all the wheels of the parallel gears are constantly in mesh. Rotation is effected against the pressure of a friction force exerted, for example, by friction wheels acting on one wheel of a given gear set. The other gear wheel of the respective set which is provided with a female thread in its centre hole is able to move longitudinally within a restricted range on its threaded shaft, while the two gear wheels are rotating at relatively different speeds. As a result of this movement the respective right or left-hand end position of the threaded gear wheels indicates whether the speed ratio between engine and gear output shaft is larger or smaller than the transmission ratio of the respective gear step, or whether it is the same. These facts are then transmitted as electrical signals by the opening and closing of electrical contacts.

In the case of an Otto engine the present invention proposes that the contacts which indicate that the respective engine speed is too high, are used for the purpose of cutting out the ignition when changing gears up, so that the engine speed is reduced to the point where the next higher gear may be engaged without causing jerks, while when changing gears down the two contacts prevent the engine, which is not under load during the gear-changing process, to attain a higher speed with its throttle opened than jerkless engagement of the next lower gear step would require.

If the change-speed gear used in such a case is not of the synchronized type the invention provides that the closing of the two contacts on the parallel gear, which indicates that the speed ratio is the same as the transmission ratio, is used to initiate the shifting of the respective gears.

*Initiating devices in parallel gear*

It is a further object of the present invention to use a parallel drive, in addition to controlling the actual change-speed gear, also in connection with centrifugal or fluid clutches by measuring their slip to prevent overheating, particularly when driving through mountains. When in such a case the slip has become so large that the next lower gear may be engaged without jerking, the parallel gear acts as an initiating device and closes the respective contacts for initiating the down-changing process, in which case during the coasting of the vehicle a switch on the gas linkage, which opens only when the throttle flap is closed and the gas pedal is therefore unloaded, will jump all the other steps to eliminate unnecessary shifting and will engage the first gear directly.

*Independent initiating device*

There is still another initiating device which in dependence on engine speed and engine torque, the latter indicated by the respective position of the throttle flap or the gas pedal, will automatically initiate the gear change. With the vehicle speed remaining constant as indicated by constant engine speed, stepping on the gas pedal will initiate a down-change, releasing the gas pedal will initiate an up-change, to the extent both changes are permissible by general driving conditions. With the gas pedal position remaining the same while vehicle speed increases, the up-change will be initiated, while on steep grades, with vehicle speed decreasing, a down-change will be initiated, with the timing of the change always depending on the relative engine speed and vehicle speed on the one hand, and on the gas pedal and throttle flap position on the other.

Applications for such a purpose are known. Similar to the embodiment used here, for example, and described later is an arrangement (German Patent 943,446) in which the indicator of an engine speedometer is electrically conductive and moves constantly longitudinally on a slide operated by the gas pedal, the slide being provided with contact strips for changing up or down separated by an insulating strip, with the throttle being actuated by the gas pedal over a cam disk. This arrangement has the disadvantage that because of the friction caused by a contact pressure between the indicator of the engine speedometer and the insulating strip or contact strips, respectively, a hysteresis is created which can only be held in non-troubling limits by providing a sturdy and therefore larger speedometer. Still another disadvantage is that though any desired and changeable ratio of motion between the gas pedal and the throttle flap may be obtained by the cam path no such possibility for variation exists where in stepped gears such a possibility is definitely required, for the purpose of permitting up and down-gear changes at the various throttle flap positions, because that ratio is always the same as determined by the length of the insulating strip. The present invention proposes to eliminate these disadvantages by using a swiveling speedometer indicator which is electrically conductive or connected to mass and moves between the two contact strips, which are also swivel-mounted, initiating thereby the up and down-gear change. The indicator swivels in dependence of the engine speed in a free and unobstructed location, because it is energized over the coil spring of the speedometer. The two contact strips swivel jointly in dependence of the gas pedal or throttle flap position, respectively. If the indicator touches one of the two contact strips a up or down-gear change movement is initiated. The out-of-centre arrangement of the pivot axis of the indicator in relation to the axis of the two contact strips causes the finger of the contact rails during the various throttle flap positions to touch the contact strips always in one position, so that by curving the two contact strips at will any characteristic for changing up and another characteristic for changing down can be obtained in a simple manner.

Instead of using the engine speed for the above purpose the underpressure in the intake line of the Otto engine can also be used.

*Gear-changing servo devices*

For gear-changing servo devices the present invention proposes the use, among others, of solenoids, known as switching solenoids, which are either attached directly to the change-speed gear or are connected with the said gear by linkages. Since the sliding sleeve or sliding wheel must be shifted by the solenoids into any end position and out of such end position back into central position, the said solenoid consists of two symmetrically arranged individual solenoids, that is, they have two pull-in, and depending upon type, also two holding coils. Central position is a.o. attained by controlling the current indirectly and feeding it over suitable contact strips and relays only up to the centre position. In addition, arrangements have been made to prevent "sticking" of the said solenoids when they are disengaged by means of counter-current. This disengagement may also be supported or effected by an additional servo or disengaging solenoid.

Another design of the switch solenoid will result in a still more favorable shape because the effective portion of the magnetic field is moved from the radial position at the longitudinal axis toward the outside and will thereby act on a much larger area, while the coils are displaced radially inward, thus permitting shorter wires with the number of coils remaining the same; the reduced length of the wires permits at similar resistance also the use of reduced wire cross sections, which offers the additional advantage of substantially reduced material and space requirements.

Instead of being actuated by electricity the speed-changing servo devices may also employ air pressure or the engine underpressure, the first for example, when the vehicle is already provided with an air compressor for pneumatic brakes and springing, or oil pressure, when the vehicle provides oil at a usable level and viscosity of the oil at all operating conditions. In the latter case the speed-changing servo device will be provided with suitable pistons or diaphragms and the medium acting on the said pistons or diaphragms will then be controlled by the programme controlling device by means of solenoid valves known in the art.

*Programme control device*

The programme control device consists of several electric relays, generally with several contacts and one coil each. The relays are connected with each other by means of electric lines. Instead of a relay one or several transistors may be used or other switch elements performing like relays. As proposed by the invention the relays have either general tasks or they are connected to act on one definite gear step, the general tasks requiring mainly a switch-over relay and a work current relay, which are energized after the beginning of the gear-changing operations, with the first named relay taking from the initiating devices during the shifting operation the current for initiating, while the second relay feeds to the programme control device the working current for engaging and disengaging the speed steps; both relays may also be combined. Then there is a change relay which is in control during the shifting operation beginning with the disengagement of the previously used speed step and ending with the engagement of the next following step, and a relief relay for models without separating clutch which, when the power for disengaging the respective speed step as available will effect the cutout of the ignition and will also permit accelerating while shifting, if a revving-up device is available; in addition there is an idling relay, which prevents cutout of the ignition during idling speed, and a hand relay to break the holding power of the switching solenoids, as well as a bimetal blinker, which during abnormally long gear-changing operations will control the work current relay in such a manner that the switching solenoids will operate intermittently and will not be overheated. Other devices which may be employed are a delaying relay or a delaying bimetal fixture, then for each gear step a pre-relay, which receives over a series-connected location relay the initiating impulse and stores that impulse for the duration of the gear-changing operation, a main relay for each gear step, which energizes all the relays and switches participating in a gear-changing operation; a pull-in relay for each gear step which effects the engagement of each gear step, but which may also be combined with the main relay; also a locating relay for each gear change which indicates the complete or partial engagement of the respective gear step and which on the one hand feeds the impulse for initiating a gear-shifting operation to the pre-relay of the next higher or next lower gear-changing step, and on the other hand may control in the first phase of the gear-shifting operation the disengaging of the previously engaged gear step, as well as a controlling relay which may effect in models with automatic clutch, if required, beyond the actual gear-changing operation also the regulating of the engine up to full engagement of the clutch.

*Overall arrangement*

A complete driving system for a motor vehicle consists of an engine, for example an Otto engine, then comes a centrifugal or hydraulic clutch for starting and a change-speed gear drive, which permits the engagement of several speed steps having various transmission ratios. The driver may use a manually operated shift stick which when used for automatic gear drive may be shifted, as known, into the various positions for neutral, reverse, and a number of forward speed positions, in which, for example, all the forward speeds may be automatically engaged, upon which there will be a position, in which the top forward speed will be blocked, etc. up to a position, in which only the first gear may be engaged. Then there may be a parking position, unless parking protection is provided by the engine in a manner, known from automatic clutches, in which a freewheeling member in the centrifugal clutch and perhaps also in the hydraulic clutch permits the engagement of a forward speed when parking downhill, or the engagement of a reverse speed when parking uphill. As known this idling member has the additional advantage of preventing the engine from getting out of step during certain operating conditions of a centrifugal clutch.

Though the individual gear steps may be shifted by the switching solenoids the invention also provides for the use of a linkage which, in view of the braking effect during parking, also permits mechanical engagement of the first and reverse gear, and which for safety reasons mechanically disengages all gear steps in neutral position by using suitably formed levers. In addition, for types without separating clutch, which may be located in the driving mechanism, or in models which may not have the revving-up fixture described later, there may be a device which permits during manual shifting the disengagement of the engaged gear step. According to the invention this is done by suitably formed levers which are connected with the hand shift lever by linkages, in which the power of the holding coils in the switching solenoids which must be eliminated, is cut out by a pair of contacts in the shift stick which are closed when moving the stick.

A multi-pole main switch is connected with the hand shift stick and permits by the opening and closing of contacts in the various positions of the hand shift stick in a manner which is described in closed detail later, automatic operation in the desired respective gear range.

To cut out the ignition the known method of bridging the contact breaker is used because such an arrangement guarantees that no premature ignition will occur. For bridging the known method of connecting a line from the line between the ignition coil and the contact breaker to the programme control device is established.

Pairs of contacts on the change-speed gear are used to instruct the programme control device which gear step is in engagement, and their closing or opening according to the invention informs the programme control device in what engaged or centre position the respective sliding sleeve or sliding wheel is at the moment, in addition there are end position switches which indicate that the respective gear step is completely engaged. All these switches or indicators may be attached to the switching solenoid.

Attached to the gas linkages is a pair of contacts which opens the gas pedal in idling position and breaks the current flow to the initiating device in the parallel gear as already described. In addition, other switches may be attached to the gas linkage, depending on the respective design.

If required a similar method as known from electric starters on combustion engines may be used, which permits the engagement or disengagement of the gear steps with double electric energy available in switching solenoids.

*Operation*

As soon as the driver has switched on the ignition, started the engine and shifted the hand shift stick into driving position the first gear step will be engaged by the respective switching solenoid or magnetic valve. When he steps on the gas the centrifugal or hydraulic clutch will transmit the rotation of the crankshaft and the vehicle will move under acceleration while the engine speed increases. If then, depending on the position of the gas pedal, the up-change shifting operation is initiated by the initiating device already at medium engine speed, or high or maximum engine speed, the respective switching solenoid will be energized to disengage the first gear step. During the disengaging process the ignition will also be shortly interrupted, as known, so that at the moment of changing loads the respective gear step may be disengaged, as known, with a minimum of force. If the system contains an automatically acting separating clutch this interruption of the ignition for the purpose of changing gears is not required.

When the first gear is disengaged the regulating device, the parallel gear, will short the ignition until the engine speed has dropped to the point where the second gear step may be engaged without jerking, upon which the engagement is performed by feeding current to the switching solenoid or solenoid valve operating the second gear step. The same applies to the up-changing from the second to the third gear etc., depending on the number of gear steps available.

Changing down may of course be effected during medium to low engine speed by the automatic initiating device, and during low engine speed by means of the slip in the centrifugal or hydraulic clutch of the initiating device of the parallel gear, with more or less gas available, as the case may be. The respectively engaged gear step is similarly disengaged while changing up. With the gear step disengaged the now unloaded engine may increase its speed because of the partially or entirely opened throttle flap until that speed is high enough to engage the lower gear step without jerking. An increase beyond that speed is impossible because the ignition will then be short-circuited in the control fixture. The respective switching solenoid will then engage the lower gear step.

If during mountain driving, in order to use the engine brake, speeds are changed down by operating the hand shift stick the gas pedal must be operated after the respective gear step has been disengaged, until the lower gear step connects. This can be prevented if the system contains an automatically acting separating clutch similar to automatic clutches, or by using the device described below.

*Revving-up device*

The need to step on the gas when "changing-down manually" may be dispensed with by using a revving-up device which also permits manual disengagement. According to the invention this is made possible by a solenoid, named gas solenoid, which opens, when energized, the throttle flap sufficiently to permit the unloaded engine to attain almost a maximum speed, with the gas solenoid being controlled in such a manner that it will be energized when changing-down manually after the speed step previously used has been disengaged; the gas solenoid will also become energized when a speed step is disengaged or engaged manually, so that the moment the engine load changes from the initiating stage to engagement the respective speed step can be disengaged or completely engaged.

*Automatic separating clutch or automatic clutch*

Revving-up when changing down manually can also be prevented without requiring a revving-up device, if an automatic separating clutch similar to the known automatic clutches is installed between the engine and the change-speed gear, in which case the setup requires, as known, a change-speed gear with synchronizing device. According to the invention the automatic clutch is also controlled by the programme control device and will separate the engine from the change-speed gear also during the automatic shifting. Contrary to the known types the automatic adjustment of the engine speed during the shifting operation may cause the delay experienced when engaging clutch while shifting under load, in particular under full load, to be zero, so that even the sportscar driver may benefit, because no interruption of the pulling force will be felt during the shifting.

Here the first gear step need not be synchronized.

*"Creeping" of stopped vehicles when using hydraulic clutch*

Vehicles with a hydraulic clutch or torque converter have the disadvantage of "creeping," that is, they will not remain on the same spot when stopped with a gear step engaged but will actually move very slowly, and in fact the more, the higher the idling speed of the engine.

It is a further object of the invention to prevent this from happening by permitting the vehicle, while coming to a stop, to automatically initiate the shifting operation into first gear by disengaging the gear step engaged prior to coming to a stop, upon which, instead of being completed, the shifting process is merely interrupted. This interruption is effected by another pair of contacts on the gas linkage, which is open only in idling position of the gas pedal. The vehicle is unable to "creep" then because no gear speed is engaged, since speed 1 is more or less just under tension. Only when the driver again steps on the gas will the pair of contacts on the gas linkage be closed and the first gear step engaged. By arranging the electric switching system according to the invention the engine speed will not exceed idling speed in spite of stepping on the gas until the first gear step is completely engaged.

*Most favorable design of gear drive and clutch*

When synchronized the known types of change-speed gear are either fully synchronized with all the forward gears characterized by one of the known synchronizing units, or they are partially synchronized, in which case only the upper gear steps of the known types are synchronized. If in a change-speed system all the operations according to the invention, including automatic shifting and changing down by hand are to be performed without an automatic separating clutch with the least possible bother and maximum safety, a fluid coupling is best suited for the purpose. Owing to the device for the prevention of "creeping" a fluid coupling can be used without disadvantage also for smaller engines with a low number of cylinders and therefore a higher idling speed. To permit noiseless shifting of the parking vehicle the change-speed gear driven by the fluid clutch need only be synchronized in the first and the reverse gear step, while all the other gear steps may be operated by means of sliding wheels or claws.

In accordance with the invention the most suitable design of a change-speed gear with five, or with three forward speeds, if so desired, in which the synchronized first gear and the reverse gear is operated by a common sliding sleeve and in which in addition the sliding wheel and the sliding sleeve may be positively interlocked in their respective centre or end position, in order to eliminate the need for holding coils in the respective switching solenoids and to save the electric current continuously required by such switching solenoids, while in addition obtaining a more accurate operation of the sliding wheels or sliding sleeves.

*Protection against senseless down-changing by hand*

Higher-priced vehicles may be provided with a device which keeps the driver from changing down manually beyond a given engine speed.

According to the invention this is done by means of a solenoid which is controlled by a speed regulator driven by the engine in such a manner that it will block the shift stick once a given engine speed is reached against any attempt for changing down manually by locking the shift lever against such a possibility.

*Additional protection against overspeeding of engine when changing-down manually*

To provide absolutely fool-proof driving conditions the device named in the previous paragraph may be extended to the point that whenever the driver has changed down manually and omits to change up again with increasing driving speed the gears are nevertheless changed up if there is the danger that the engine will overspeed after passing the permissible maximum speed.

According to the invention this is done by another solenoid which is controlled by a speedometer driven by the engine in such a manner that when the permissible maximum engine speed is reached it will move the hand shift lever into shifting position, that is into the change-up position to the next higher gear step, using a common speedometer for the purpose.

Both safety devices may be designed in such a manner that no solenoids are used and the required safety methods are passive ones applied during the "manual change-down" and according to the invention by means of opening or closing suitable contacts connected with the hand shift lever, by means of which the initiating function is transmitted from the also load-dependent initiating device to the only speed-dependent speedometer.

Further features of the invention will become more apparent from the description of several embodiments as applied to Otto engines and shown in the drawings, in which:

FIG. 9 (9a and 9b) shows a complete arrangement for a fully synchronized four-speed gear with centrifugal clutch.

The various arrangements shown in the individual illustrations may also be used in different combinations than shown here.

Figure 1:
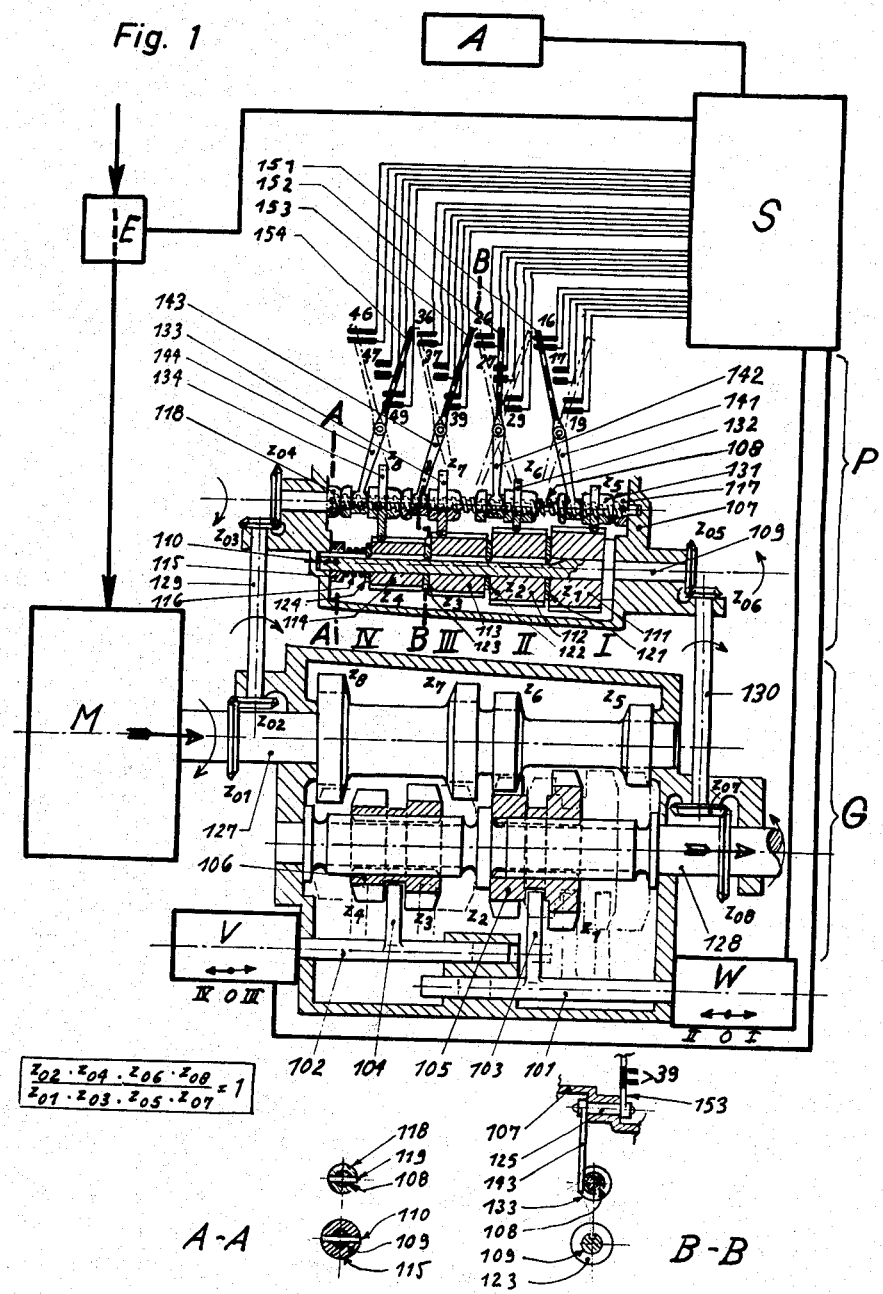
FIG. 1 shows a change-speed gear with parallel gear as controlling device, and the other parts of the transmission system in purely diagrammatic view.

FIGURE 1 shows a change-speed gear with parallel gear as controlling device, and the other components of the system in purely diagrammatic representation.

An engine M drives a change-speed gear G which is provided with four speed changes. The said change-speed gear carries two switching servos W and V which move sliding wheels 105, 106 over shift rods 101, 102 and shift forks 103 and 104 during the shifting and thus engage the four different speeds. In addition the change-speed gear consists mainly of a drive shaft 127 and an output shaft 128.

Arranged parallel to the change-speed gear G is a second, small gear, named parallel gear P. It consists of a housing 107, in which a threaded shaft 108 and a keyed shaft 109 are rotatably arranged, the latter having a longitudinally extending groove and a collar. On the last-named shaft are rotatably arranged four gear wheels 111, 112, 113, 114. A ring 115 is permanently connected with the keyed shaft 109 by means of a pin 110, as shown in section A—A. On shaft 109 between gear wheels 111, 112, 113, 114 and left of the last gear wheel 114 are disks 121, 122, 123, 124. These disks slide longitudinally on shaft 109, but they do not rotate on the said shafts because, as shown in section B—B in the example of disk 123 they are provided with an inside nose which enters into the longitudinal groove of shaft 109. Between disk 124 and ring 115 is a compression spring 116. The said spring is under tension and bears at one end over ring 115 and pin 110 on the keyed shaft 109, and on the other end over disks 121, 122, 123, 124 and the intermediate gear wheels 111, 112, 113, 114 on the collar of the keyed shaft 109. As a result of the thrust pressure of the compression spring 116 a friction force is produced between disks 121, 122, 123, 124 and the gear wheels 111, 112, 113, 114, located between the said disks and the collar of the shaft, to create a given friction torque.

Because of the said arrangement gear wheels 111, 112, 113, 114 will not participate in the rotation of the keyed shaft while subjected to a force smaller than the friction torque. In such a case they turn at will or they are completely at rest while shaft 109 keeps turning. On the threaded shaft 108, which should have a rather steep thread, the right-hand and left-hand end of the thread is provided with one unit 117 and 118 each, which is permanently connected with the threaded shaft 108, as shown in section A—A by nut 118, which is connected with the threaded shaft 108 by means of a pin 119. On the threaded shaft 108 are gear wheels 131, 132, 133, 134, which are provided with suitable female threads at their centre holes and which are constantly in mesh with the respective gear wheel 111, 112, 113, 114. The length of gear wheels 131, 132, 133, 134 is such that they are permitted to travel a given, axial path when they are rotating at a given relative speed in relation to the threaded shaft 108, in the course of which path they will abut either against the adjoining gear wheels or depending on their position on the threaded shaft directly on nut 117 or 118. In addition gear wheels 131, 132, 133 and 134 are provided at their circumference with a ring groove each, with a swivelingly supported lever 141, 142, 143, 144 being attached to each respective ring groove, with each lever provided at its top portion with one contact finger 151, 152, 153, 154 each, and each of the said contact fingers being provided with three contact strips insulated against each other, as shown diagrammatically by the fully drawn-out portions of each contact finger. Immovably arranged behind contact fingers 151, 152, 153, 154 are the contact pairs 16, 17, 19 for the first gear speed; 26, 27, 29 for the second speed; 36, 37, 39 for the third speed and 46, 47, 49 for the fourth speed. If contact fingers 151, 152, 153, 154 are in centre position they will close in each case the respective pair of contacts having the final numeral 7, if the contact fingers are in their left-hand end position they will close the respective pair of contacts having the final numeral 6, and in their right-hand end position they will close contacts having the final numeral 9. As shown in section B—B and in the example of lever 143, this lever, as well as the other levers, is permanently connected with contact finger 153 by means of a shaft 125 rotatably mounted in housing 107, while projecting out of the oil-fill housing 107.

The contact pairs are connected with a programme control device S by means of electrical lines, with additional electrical lines extending to the switching servos W and V which may be solenoids, known by the name of switching solenoids, with additional electrical connections to an initiating device A, a device E to regulate the fuel supply to the engine M for the purpose of regulating the speed to the said engine.

The parallel gear P is driven in front by means of a rotatably supported intermediate shaft 129 and the bevel gear wheels with tooth numbers $z_{01}$, $z_{02}$, $z_{03}$ and $z_{04}$ from the drive shaft 127 of the change-speed gear G to the threaded shaft 108 and it is rotated in the rear by the output shaft 128 of the change-speed gear G with power transferred to the keyed shaft 109 over a second intermediate shaft 130 and the bevel gear wheels with tooth numbers $z_{05}$, $z_{06}$, $z_{07}$, $z_{08}$. The transmission ratio of the front drive is the same as the transmission ratio of the rear drive to effect for gear drive shaft 127 driving the threaded shaft 108 the same speed ratio as for the gear output shaft 128 in relation to the keyed shaft 109.

Gear wheels 111 and 131 for first gear, 112 and 132 for second gear, 113 and 133 for third gear and 114 and 134 for fourth gear in the parallel drive P have the same number of teeth as the gear wheels for the respective gear steps in change-speed gear G.

FIG. 1 shows change-speed gear G with the second gear engaged. Contact finger 152 is shown in centre position, but might be in any other position temporarily occupied when the second gear is engaged, because there is no relative rotation between threaded shaft 108 and gear wheel 132 while in operating condition. Contact fingers 153 and 154 for third gear and fourth gear are at right and close contacts 39 and 49, by means of which they transmit to the programme control device S the signal that the speed of engine M for engaging the third or fourth gear step would be too high; contact finger 151 for first gear is at left and closes contact pair 16, thereby signaling to programme control device S that the speed of driving engine M is too low to engage first gear.

With regard to the axial motion of the gears on threaded shaft 108 the result, that is, axial movement of these gear wheels when rotating at relative speed in relation to threaded shaft 108, would be the same, if instead of being threaded, shaft 108 would be provided with longitudinal grooves and the gear wheels of parallel gear P would therefore be provided with helical or bevel teeth.

Operation of the arrangement described in FIG. 1 is as follows: The gear shifting operation is initiated by initiator A by means of an electrical signal to the programme control device S. If the signal is a command for changing up, the programme control device S, with the second speed engaged as shown in the drawing, will execute the gear shifting operation into third gear. The switch solenoid W will be energized and the second speed will be disengaged. The engine is temporarily relieved of its torque so that switch solenoid W is not required to pull under load. Contact pair 39, which is still closed, signals to the programme control device S that the speed of engine M is too high to shift to third. The programme control device S therefore signals to the regulating device E to throttle the fuel supply to engine M. As soon as the engine speed is down somewhat below the point required for shifting to third, contact finger 153 will move toward the left and close contact pair 37, which will signal synchronized speeds, upon which programme control device S will energize switch solenoid V for the purpose of shifting to third. If this effort would not be immediately successful, contact finger 153 would move further toward the left and thus open contact pair 39 (and also close contact pair 36), thus keeping the engine exactly synchronized, upon which shifting to the third would be completed without effort.

The operating procedure when shifting down is different only insofar that the respectively acting contact with the final numeral 6 would effect an increase of the fuel supply to engine M and the resulting increase in engine speed would then actuate the shifting operation.

Figure 2:
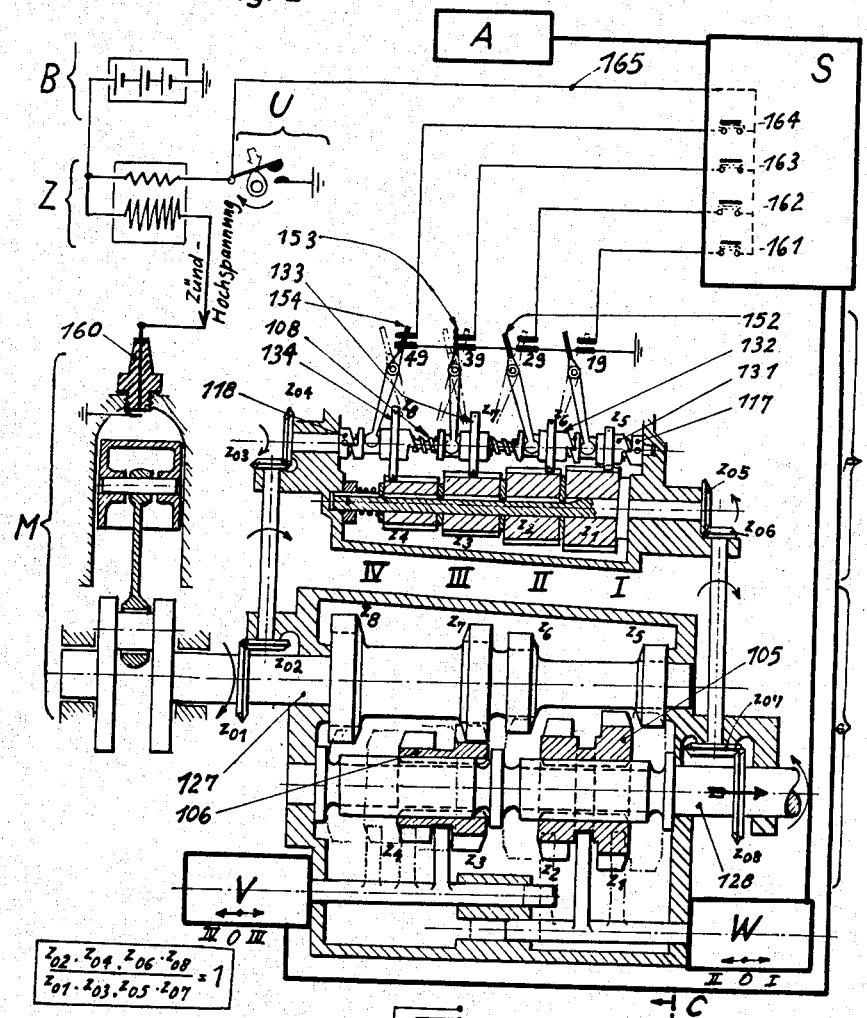
FIG. 2 shows a change-speed gear with parallel gear as controlling device, and the arrangement for shorting the ignition in a diagrammatic view.

FIGURE 2 shows a change-speed gear system with a parallel gear as controlling device, and a diagrammatic view of the arrangement for shorting the ignition. Arrangement and operation are as in FIG. 1 with the following differences:

Parallel gear P is provided per gear step only with contact pair 19, 29, 39, 49, respectively, which are closed in each case whenever engine speed for the respective gear step is too high, with one contact each rigidly connected to mass. Engine M is an Otto engine with a spark plug 160. The programme control device S is provided with four switches 161, 162, 163, 164, which cooperate with gear steps 1, 2, 3, 4, respectively, and are shown opened. One contact of each switch is connected by means of a common line 165 with the line between an ignition coil Z and a contact breaker U, driven by engine M. A power source, battery B, provides the direct current for the system. Ignition is effected as known by the opening contact breaker U, which breaks the existing field in the ignition coil, as the result of which the created high-tension in spark plug 160 will jump to mass and create the required spark.

In addition, FIG. 2 shows that gear wheels 131, 132, 133, 134 rotating on threaded shaft 108, as well as nuts 117, 118 are provided with noses to eliminate any possibility of jamming during operation.

Operation of the arrangement shown in FIG. 2 is as follows: In the drawing the change-speed gear G shows the third gear step as engaged. Following the initiation of a changing-up shifting operation by the initiating device A the switch solenoid V disengaged, as described, the third gear step. If then, in a manner not shown in detail here, switch 164 of the programme control device, cooperating with fourth gear, is closed, there will be no more ignition, because contact breaker U has been bridged by switch 164 and contact pair 49. The Otto engine M will immediately reduce its speed. Speeds will drop to the point where the speed ratio between gear input shaft 127 and gear output shaft 128 will correspond with the transmission ratio of fourth gear. It cannot drop further down, because this would move contact finger 154 toward the left and ignition would be restarted. Fourth gear can now be engaged without jerking.

If, on the other hand, the initiating device A initiates a changing-down operation and switch 162 will be closed in the process, the engaged third gear will be disengaged as described. Since, with the exception of special cases, during the changing-down operation the throttle flap of engine M is entirely or partially open and engine M is not under load after the gears have been disengaged, engine speed will increase immediately and reach the speed corresponding with the transmission ratio of second gear. If engine M begins to rotate still faster, contact finger 152 will move toward the right and will short the contact breaker U over contact pair 29 while switch 162 is closed, ignition will be interrupted and the engine cannot overspeed. Second gear can then be engaged without jerking. When engaging the other gear steps the same operating method applies.

Figure 3:
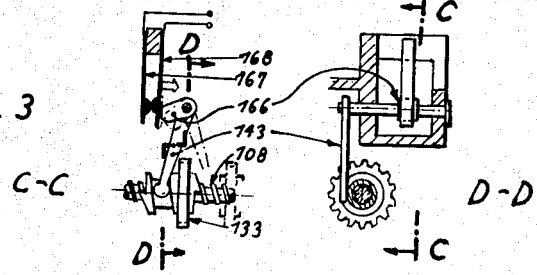
FIG. 3 shows the specially designed parts of the parallel gear.

FIGURE 3 shows specially designed components of parallel gear P. Section C—C shows a portion of threaded shaft 108 and as an example on the said shaft the gear wheel 133 for third gear. However, the ring groove shown is not a straight one, but cut at an angle. During the rotation of gear wheel 133 lever 143, which operates the contacts, will perform a reciprocating motion. This will provide the following results:

First, adjustment of the engine speed during the shifting process will become more sensitive, because in the course of one revolution the starting and the stopping of the ignition process will alternate, and the slightest axial shifting of gear wheel 133 will provide a change of the relationship of "on" and "off," so that there will be a more accurate and faster adjustment of the engine speed with less "hunting" as would be possible when the engine has several cylinders.

Second, the axial engaging of the gear step is much better when the shifting path is long, that is, when slide wheels 105 and 106 shown are actually used. The reason is that even after the slide wheels are already partially in mesh during the shifting operation the ignition still continues to be switched on and off, so that the slide wheels 105 or 106 may be completely shifted in position at the moment the load changes.

Independent of the above FIG. 3 also shows the actuation of the contact pair not by a moving contact but by non-moving contact by means of cam 166 permanently attached to lever 143. The arrangement of contacts 167 and 168 is shown here in a simplified manner, without insulation, etc.

Figure 4:
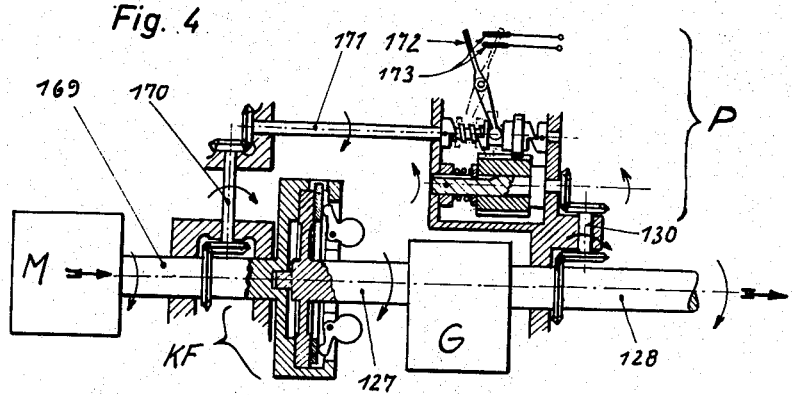
FIG. 4 shows a centrifugal clutch with a parallel gear as initiating device.

FIGURE 4 shows a centrifugal clutch with parallel gear as initiating device. A centrifugal clutch KF is located between engine M and change-speed gear G. An engine shaft 169 drives over intermediate shafts 170, 171 and over bevel gears the parallel gear P in front. With the arrangement shown here only in the shape of one pair of gear wheels out of several, depending on the number of speeds provided. From the rear the parallel gear is driven by the gear output shaft 128, the intermediate shaft 130 and over the respective bevel gears. Arrangement and drive is parallel to change-speed gear G and centrifugal clutch KF.

The speed of centrifugal clutch KF above its clutching speed is constant and the parallel gear P may be used in a manner, not shown here, as controlling device in a manner not shown here, exactly as in FIGS. 1 and 2. If, as shown here by the example of the one pair of gears of parallel gear P shown here, the next higher gear step is engaged, contact finger 172 will be at left. When the engine speed drops below the clutching speed, depending on the torque of engine M the slip of the centrifugal clutch KF will initiate a difference in speed which will also be transmitted to parallel gear P. At a certain magnitude of the slip, which corresponds also to the speed ratio of the next lower gear step, the movement of contact finger 172 to the right and the resulting closing of contact pair 173 will initiate the shifting operation to the next lower gear step, because contact pair 173 is connected, in a manner not shown here, with the programme control device. The result will be the same, if clutch KF is not a centrifugal clutch but a hydraulic clutch, or a mechanically or magnetically controlled clutch independent of speed.

Figure 5:
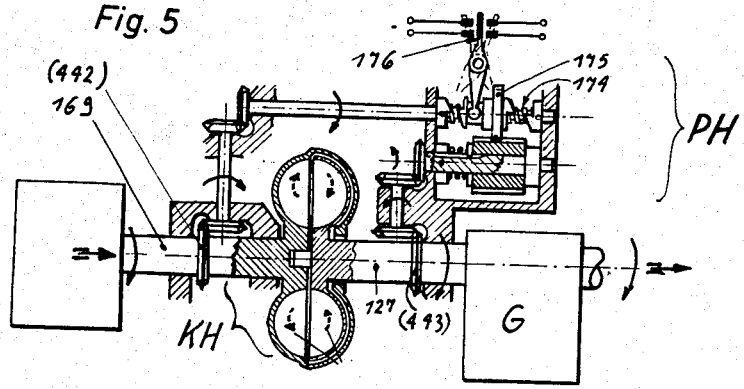
FIG. 5 shows a hydraulic clutch with a parallel gear for pull or push indication.

FIGURE 5 shows a centrifugal clutch with parallel gear to indicate push and pull operations, which serve entirely different purposes than described in FIG. 4. A hydraulic clutch KH is located between drive engine M and change-speed gear G. Arranged in parallel to the said clutch is a parallel gear which is driven in front by engine shaft 169 and at the rear by gear output shaft 127. The drive is effected in such a manner that at uniform speed of these two shafts there is also no relative rotation between a threaded shaft and the gear wheel 175 attached to the said shaft of the parallel gear PH. As shown in the drawing operation under pull will have a contact finger 176 at right, and operation under push at left, so that the respective load condition is indicated by the closing of the proper pair of contacts, while the centre position of contact fingers 176 shows uniform running conditions in hydraulic clutch KH.

Figure 6:
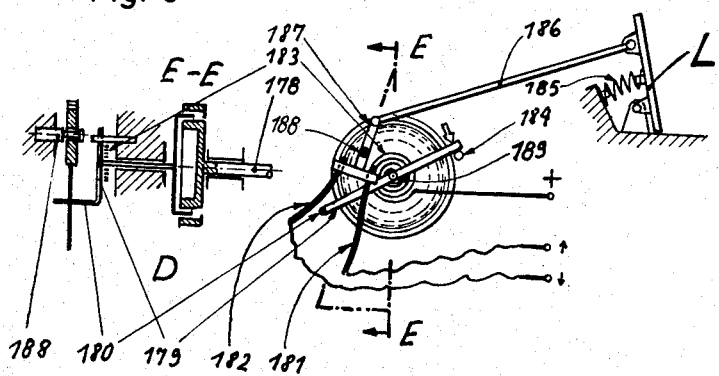
FIGS. 6, 7 and 8 show an initiating device in various positions.

FIGURE 6 shows an initiating device. A speedometer D operating on the eddy-current principle is driven from an engine M, not shown, by means of an elastic shaft, not shown, attached to a shaft end 178. A swivelingly arranged and insulated indicator 179 of speedometer D, which carries at its tip a contact finger 180, will then show by its respective position the engine speed available at the moment. Contact finger 180 is energized over indicator 179 by means of coil spring 183, which also serves the original purpose of pressing indicator 179 against a fixed, insulated stop 184 when the engine is stopped, as shown by the hollow arrow.

A gas pedal L is swivelingly mounted and held in idling position by means of compression spring 185. Gas pedal L is connected in a manner, known as such but not shown here, with the throttle flap of the Otto engine. By means of a linkage 186 the gas pedal L is connected with a swiveling bracket 187 which is rotatably supported in a fixed pin 188. Bracket 187 holds two insulated contact strips 181 and 182, which are connected in a manner, not shown here, to the respective supply lines. Contact between contact finger 180 and contact strip 181 will initiate changing up, and contact between contact finger 180 and contact strip 182 will initiate changing-down electrically.

Figure 7:
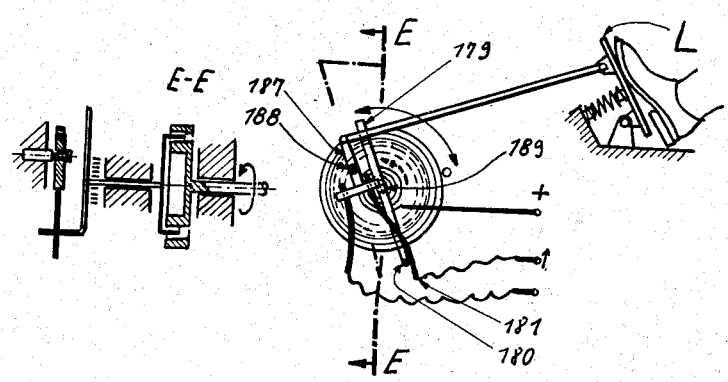

FIGURE 7 shows the initiation of the changing-up gear shift. In the position shown gas pedal L has been fully pushed down by the driver to full throttle position, and the indicator 179 will have to move first fully through the indicated angle which corresponds to maximum speed of the engine, prior to obtaining contact and the resulting initiation of the changing-up operation.

If the throttle is not wide open contact finger 180 and contact strip 181 will meet already at lower engine speed. Because of the various positions of pin 188 about which bracket 187 with its contact strips 181, 182 swivels, and because of the varying positions of the centre of rotation 189 of indicator 179 contact in the various positions will always be made at a different point of contact strip 181. It is therefore possible by using any given design to obtain any given location of the initiating point for changing-up, in dependence of engine speed and the position of gas pedal L, that is the torque.

Figure 8:
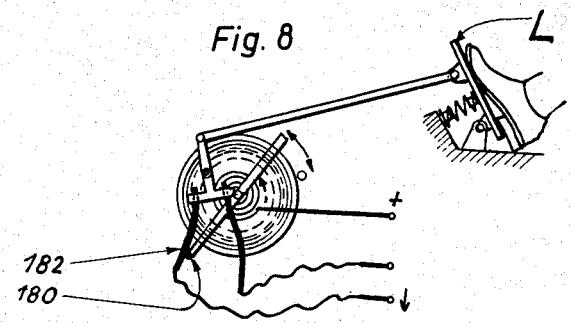

FIGURE 8 shows the initiation of the changing-down operation. This is done similar to changing-up, but vice versa and in a respectively lower speed range of the engine. Here too, it is possible to use any given shape of contact strip 182 to obtain any given characteristic.

FIGURE 9 shows a complete system for a fully synchronized four-speed gear with centrifugal clutch.

The arrangement shown is not the most favorable one, it is mainly presented for better understanding of illustrations which follow later and should be considered a simplified initial stage.

The main components or parts of this arrangement are a gas pedal L, an initiating device A, a hand shift stick H, which is also designed as main switch, another engine M, for starting a centrifugal clutch KF with a freewheeling device F, which when driven by the wheels of the vehicle will be able to drive engine M, a change-speed gear G with four forward speeds which are fully synchronized and block-synchronized, with a directly driven fourth gear and a reverse gear, a parallel gear P, switch solenoids W and V, a programme control device S, a current source B, as well as a contact breaker U and an ignition coil Z.

The gas pedal L is connected with throttle flap 302 by means of a rod 301, and in addition by means of a rod 303 with the initiating device A. A compression spring 304 closes throttle flap 302 and forces gas pedal L into the idling position shown in the drawing. The throttle flap 302 may be additionally designed in such a manner that, as known, acceleration beyond the full throttle position is possible, with the required effort on the pedal clearly noticed by the driver's foot.

Rod 301 has a nose which opens in idling position a switch, consisting of a fixed contact 305 and an elastic contact 306; as shown by the arrow in the drawing this contact pair is closed automatically in any other position of gas pedal L.

The initiating device A corresponds with the one shown in FIGS. 6, 7 and 8 and is driven by a flexible shaft 307 from engine M, it is provided with contacts 180, 181, 182, identified here on their feed lines.

Hand shift stick H is swivelingly supported in a fixed pivot pin 308. In addition it consists in the embodiment shown here of two parts, that is of a handle portion 309 and a frame portion 310. Each of these parts carries in insulated position an electrical contact 311 and 312, which are normally not closed and are arranged in such a manner that they will close when hand pressure is exerted on hand shift stick H. The latter serves simultaneously as a main switch for the system and is provided with a lever 312 which in turn is provided with a number of separate contact strips which in dependence of the position of hand shifting H permit the electrically conductive connection of a number of fixed contacts or contact strips 313, 314, 315, 316, 317, 319, 320, 321 designated by their supply lines, with each other. A rod 322 transmits the movements of hand shift stick H to a gear shift lever 323, which is mounted swivelingly in a fixed pivot pin 324.

The change-speed gear G has three shift rods 325, 326, 327 which carry at their left end one or more noses 328, 329, 330, 331 projecting into the swivel range of gear shift lever 323. As shown, shift rods 325, 326, 327 will shift by means of the respective shift forks 332, 333, 334 and shift sleeves 335, 336, which are attached to these rods, the forward speeds, and by means of the reversing wheel, not shown here, the reverse gear. Shift rods 325, 326 and 327 are mechanically interlocked in relation to each other by bolts 337, 338, 339, the latter of course under the assumption, that the shift rods are not located in one plane. In addition the shift rods are additionally locked by one ball 340 each and one compression spring 341. By means of a ball 342 and a compression spring 343 the gear shift lever 323 is similarly locked in the various positions of hand shift stick H.

Of the engine M only a rotatingly supported crankshaft 344 is shown, which drives gear input shaft 345 over centrifugal clutch KF, a speed of which is in fourth gear the same as that of gear output shaft 346.

Parallel gear P corresponds in its mechanical design the one shown in FIG. 1. There is a contact pair 49 for fourth gear, two contact pairs 38, 39 each for third gear, 28, 29 for second, and 18, 19 for first gear, all of which are closed when the speed of crankshaft 344 of engine M in relation to the speed of gear output shaft 346 is higher than the transmission ratio of the respective gear step, and of which those contact pairs designated with the final numeral 9 are used to adjust the engine speed during the shifting operation by shorting the ignition, while those carrying the final numeral 8 are used to initiate the changing-down whenever there is too much slip in the centrifugal clutch KF, as described in FIG. 4.

The transmission ratio of the first, second and third gear of the change-speed gear system G is the result of the transmission ratio of the pair of gears for the respective gear step and the transmission between drive shaft 345 and an intermediate shaft 347, in which the ratio of tooth members of the latter two is $z_8:z_4$. The total transmission ratio of the input and output of parallel gear P, effected over several bevel gears having tooth numbers $z_{01}, z_{02}, z_{03}, z_{04}, z_{05}, z_{06}, z_{07}, z_{08}$, from crankshaft 344 over intermediate shafts 348, 349, 350 to the gear output shaft 346 conforms to the transmission ratio $z_8:z_4$. Gear wheels 114, 134 in parallel gear P, which correspond to the fourth gear step, will then have the reverse transmission ratio $z_4:z_8$, so that the total transmission ratio for the fourth gear step over the parallel gear P is also 1:1.

Switch solenoids W and V are conventional types and are provided with the respective and known types of pull-in coils and holding coils, which cooperate with the respective gear steps.

Battery B and the generator not shown here provide ignition current for the system, the working current for the pull-in coils is taken to the programme control device S over a direct line.

The vehicle is also provided with a regulator for the generator not shown here. Below a given engine speed, which is slightly higher than the idling speed of the engine, that is approximately 800 r.p.m., this regulator or governor will contact mass and a battery current signal lamp will light up, as known.

Contact breaker U and ignition coil Z are of known construction. A signal lamp may be provided to check the work current when the gears are engaged and disengaged, and to show the driver which gear has been engaged.

The programme control device S shown in FIG. 9 consists of several relays. They are shown diagrammatically in a simplified manner, with only the coil and the moving contact bridge being drawn. The fully drawn out parts show in each case an insulated contact finger or several contact fingers which are electrically and conductively connected with each other, all the connecting lines being of a flexible type. The relays are all drawn in rest position, that is deenergized, which is also indicated by the hollow arrows which indicate the direction of the spring force acting on the contact bridges. If the coil of a relay is energized it will close as known and the contact bridge is moved toward the right into the working position indicated in the drawing by a dotted line. The coils of the relays are given numbers, which are simultaneously also the number of the respective relay, the contacts and the coil connections are however given small letters. The single-digit numbers indicate relays which have general tasks, while the numbers with two digits indicate that the respective relay and its operative effect is coordinated with the gear step matching its first number.

For series production it will be of advantage to use printed circuits. The connection with the remaining electrical parts of the system is effected over multipole plug and cable set not shown in the drawing.

Idling relay 1 shown in FIG. 9 has a fixed rest contact $a$ and a moving contact $b$. It is controlled by the regulator of the generator over mass in such a manner that it will pull below about 800 r.p.m. and will open contact pair $a/b$, while it will close when the speed is above 800 r.p.m. The purpose of this arrangement is to open contact pair $a/b$ below the said engine speed in order to prevent switching-off of the ignition, for the further purpose of keeping the engine from stalling in certain shifting conditions. To permit proper operation a coil connection $x$ is constantly energized.

The relief relay 2 shown in FIG. 9 has a moving contact $b$ and a fixed work contact $c$. The coil consists, as an exception, of a few windings of thick wire and is connected in series into the supply line of the work current which disengages the gear steps. Its purpose is to cut-out the ignition when the respective gear step is disengaged so that when the engine operates under a different load the gear step can be disengaged with little effort. The cutout is effected by closing contact pair $b/c$. This will bridge contact breaker U by mass contact, which however is only possible if work current for disengaging a gear step is already flowing, because relay 2 will pull only then.

In order to obtain an interruption of the ignition only when it is required, that is, when the car is pulling, contact $c$ of the relief valve 2 cannot be connected directly to mass but only over a load-change switch 399. This switch is installed in the vehicle in such a manner that the movement of the engine or of another part of the transmission, as a result of opposing reaction forces, will close when pulling and open when pushing.

Gear-changing relay 3 in FIG. 9 has fixed rest contacts $a, b, c, d, e, f$, and moving contacts $g, h, j$ and the fixed work contact $k$. When no shifting operation is going on this relay will be in rest position and will conduct current to the initiating device over rest contacts $b, c, d, e$, to flow to contact $h$; current will also flow over $a$ to the holding coils and from there permanently to contact $g$ and over $j$ mass. Following the initiation of a gear-change operation the relay will be in work position and remain there until the operation is completed. In this manner it will meet the task to de-energize the holding coils of switching solenoid W and V, though the latter receives current from another relay when the gear step is engaged, and the initiating device, and will then permit current to flow over the closed work contact $k$, because contact $g$ is constantly energized.

The work current relay 4 and blinker 8 are shown in FIG. 9 in a simplified manner with only one bimetal-strip, both are working together. The work current relay 4 has a moving contact $b$ which is permanently connected with battery B, and a fixed contact $c$; the bimetal blinker 8 has a fixed rest contact $a$ and a moving contact $b$ and an ohmic resistance. During the shifting operation the coil of the work current relay 4 receives current in the same manner as relay 3 on coil connection $x$ and will then carry the work current over the closed contact pair $b/c$ into the programme control device S. Coil connection $z$ of the relay is connected to mass over contact pair $a/b$ of the bimetal blinker 8. Since the latter's ohmic resistance with pulled work relay 4 is also energized the bimetal strip will heat up and will open contact pair $a/b$, which will then release work current relay 4. Following the cooling-down of the bimetal strip the relay will again pull. This arrangement will operate in exceptional cases when a gear-shifting operation takes an abnormally long time.

The hand relay 5 shown in FIG. 9 has a fixed rest contact $a$ and a moving contact $b$, with the coil connection $x$ always and contact $b$ mostly being energized by current of different origin. In rest position of the relay the said currents are conducted over rest contact $a$ to the holding coils of switch solenoid V, W. The relay serves the purpose of de-energizing the respective holding coils when the hand shift stick H is operated. In the process the coil connection $z$ of the relay will be connected to mass when the hand shift lever H is operated by way of the contact pair 311/312 in hand shift lever H which is then closed, which will in turn cause hand relay 5 to pull, upon which the holding coils will be de-energized by the opening action of contact pair $a/b$.

The change-over relay 6 shown in FIG. 9 has the fixed rest contact $a, b$, moving contacts $c, d, e, f, g$, and fixed work contacts $j, l, m, n$. Contact L is connected with a feed line of the relay coil. The change-over relay 6 serves the purpose of effecting during the gear-shifting operation the change-over during the period from the disengagement of the previous gear step to the engagement of the next following gear step. For this reason it is in rest position during the first portion of the shifting operation, with the closed contact pair $a/c$ permitting the flow of current, required for disengagement of the respective gear step, to the switch solenoid W or V. Once the two switch solenoids are in centre position, the coil of the change-over relay 6 will be energized, it will pull and because of a self-locking action will remain in this position until the end of the gear-shifting operation, with current flowing over contact pair $e/l$. This permits the switching-off of the ignition for the purpose of regulating the engine speed by means of the closed contact pair $d/j$, while the closed contact pair $g/h$ will provide the required mass for engaging the next following gear step, and the then closed contact pair $f/m$ guarantees the flow of current to the holding coils of switch solenoids W, V during the shifting, so that the pull-in coils will be energized. But since during the period in which the gear step has been completely engaged, the opening of the respective end position off-switches 381, 382, 383 or 384 on switch solenoids W or V indirectly release both the change-over relays 6 and the gear-changing relay 3, the respective holding coil would be de-energized for a short moment. For this reason the change-over relay 6 may be provided with a capacitor 6k which is connected to mass as well as to the coil connection of the capacitor and delays in a maner known as such the release of the relay, with the result that because of the early release of gear-changing relay 3 the holding coils 361, 362, 363 or 364 receive already current from contact $a$ of gear-changing relay 3 prior to the releasing action of change-over relay 6.

To permit this delay in the release of the change-over relay 6 to be also effective for the release of a new gear-changing operation at the end of a previous change the current to the initiating devices is conducted over rest contact b, which is connected with the moving contact h of the gear-changing relay 3, which receives current from the moving contact f only after the release of change-over relay 6.

Pre-relays 12, 22, 32, 42 are shown in FIG. 9 for the first, second, third and fourth gear. Apart from relay 42 for fourth gear each has one fixed rest contact a. In addition each relay is provided with a moving contact b and two work contacts c and d, with the latter constantly connected with coil connection x. The moving contact b of pre-relay 12 for the lowest, that is first gear, is constantly energized by its supply line, which in inoperative condition of the relay is carried over the fixed rest contact a over a line of the moving contact b to the next higher pre-relay 22 for second gear. The current arrives along the same path also to contacts b of pre-relay 32 and 42 for third and fourth gear, so that the moving contacts b of all pre-relays are energized. If then one pre-relay enters its operating position the opening of its contact pair a/b will de-energize the moving contacts of all pre-relays for the next following, higher gear steps. The coil connection z of each pre-relay is connected through a line over the end position disconnector 391, 392, 393, 394 of each gear step with mass. If one of the pre-relays 12, 22, 32 or 42 receives from an initiating device a short current impulse to coil connection x, which will cause it to pull, coil connection x will also receive current over contact d so that self-locking will occur and the respective relay will be released only by the opening of the pertinent end position disconnecting switches 381, 382, or 383 or 384. If several pre-relays receive simultaneously releasing impulses only the one with the lowest numeral will remain in self-locking position.

Therefore, pre-relays 12, 22, 32, 42 serve the purpose of storing a short initiating impulse for the duration of the gear-shifting operation, during which from several impulses only the one for the lowest gear step will be accepted. Contact c will conduct the stored initiating current during the duration of the gear-shifting operation.

Main relays 11, 21, 31, 41 are shown in FIG. 9 for first, second, third and fourth gear. Each of them is provided with two moving contacts b and c, as well as three fixed work contacts d, e, f. If the pre-relay of a gear step is in work position the coil of the associated main relay will be energized and will pull. The closing of contact pair b/d will thereby establish the connection with parallel gear P for adjustment of the ignition which, however, becomes effective only after the change-over relay 6 has become effective. c and e will then also be provided with current from the energized contact f. Contact c transmits this current to the gear-changing relay 3 and the work current relay 4, while contact e transmits the currents required for engaging the respective gear step. In addition the main relays 11, 21, 31 or 41 have still another purpose, that of delaying the disconnection of the current for the initiating devices somewhat, because it becomes effective a little later than the respective pre-relay, so that the pre-relay will safely attain a condition of self-locking.

Pull-in relays 14, 24, 34 and 44 are shown in FIG. 9 for first, second, third and fourth gear. Each of them is provided with one moving contact b each and one fixed work contact c with the later constantly energized during the gear-changing operation, apart from the effect of the bimeal blinker 8. Through supply line x the coil of the respective pull-in relay is energized from the pertinent main-relays 11, 21, 31 or 41 of the same gear step. The pull-in relay will however enter its working position only when its coil is also connected to mass over supply line z, which is done through change-over relay 6 only when the previously engaged gear step has been completely disengaged. The respective energized work relay will then transmit current over its closed contact pair b/c to the switch solenoid W or V for engaging.

It is therefore the task of the pull-in relay 14, 24, 34 or 44 to control the pull-in coil 351, 352, 353 or 354 for engagement of first, second, third or fourth gear. The pull-in relay of this type may also be combined with the respective main relay 11, 21, 33 or 41.

Location relays 13, 23, 33 and 43 are shown in FIG. 9 for first, second, third and fourth gear. These relays show within the programme control device S the location of the respectively engaged gear step. They serve the purpose, in dependence of that location, to control first the initiating operation and then the disengaging of the previously engaged gear step, and to indicate during manual disengaging the location of the previously disengaged gear step also after the disengagement, with the further task of conducting current to the holding coils. For this purpose their coils are constantly energized over line x, so that the relay whose associated gear step is fully or partially engaged, will be in working position, because the coil connection z will be connected to mass on switch solenoid W or V over contact 371, 382, 383 or 374 which are also connected to mass.

Since not all location relays are expected to meet all the tasks, not all those described below are provided with contacts; available are the following moving contacts b, c, d, e, f, g and fixed work contacts h, j, k, l, m, n, p, r. All contact pairs are only closed when their respective gear steps are fully or partially engaged. In such a case contact pair b/h will conduct the current impulse initiated by the initiating device A for the purpose of changing-up to the next higher pre-relay 22, 32 or 42, thereby initiating changing-up to the next higher gear step. The moving contact d is connected with the next lower pre-relay 32, 22, or 12 and will then transmit the current impulse for changing-down, which it receives either over contact k when changing back manually from the main switch on hand shift lever H, or over contact L from the initiating device A, or also over contact m from parallel gear P, while in energized condition. For changing-down from fourth into second gear, also initiated by parallel gear P, the location relay 43 has still another contact pair c/j. Contact pair e/n will transmit the current to the respective holding coil of switch solenoid W or V. Contact pair f/p effects self-locking on location relay 43 and 33, and contact pair g/r finally takes the current for disengaging of the gear step over contact g to the opposite pull-in coil, in which case contact r is energized only when a gear step is disengaged but not when it is engaged, because of the effect of change-over relay 6.

The operation of the arrangement in FIG. 9 is described as follows: Engine M is first considered inoperative with the hand shift stick H in neutral position N. When the vehicle is put to use the ignition switch 387 is first closed with contact 316 on hand shift stick H being energized. After the engine M has been started crankshaft 344 will turn the intermediate shafts 348 and 349 and the threaded shaft 108 of the parallel gear P, and also gears 131, 132, 133, 134 after they have reached the left-hand end position, the direction of rotation is shown in the drawing, contact fingers 151, 152, 153, 154 are, as shown, at the right. Gear wheels 111, 112, 113, 114 which are paired and meshed with the gear wheels named further above also rotate against friction pressure, while the keyed shaft 109 with the disks 121, 122, 123 and 124 is inoperative, because it is prevented from rotation by the intermediate shaft 350 of the inoperative gear output shaft 346. The centrifugal clutch KF does not yet transmit the rotation of crankshaft 344 because engine speed is still too low.

If the driver places the hand shift stick into the driving position marked by the Roman numerals I, II, III, IV, which means that in this position the first, second third, and fourth gear are shifted automatically, contact 317 will be energized and all other components to which it is connected. The coil connection $x$ of pre-relay 12 will then receive current for first gear over contact pair 18 on parallel gear P, as shown on the drawing. Since the other coil connection $z$ of pre-relay 12 is still connected to mass over the end position disconnecting switch 381, which is still closed, pre-relay 12 will be energized for first gear and the main relay 11 will also be energized over contact $c$ of pre-relay 12 and will pull, and will then energize over its contact $e$ coil connection $x$ of pull-in relay 14. In the meantime contact $c$ of main relay 11 has also effected the energizing of work current relay 4 and gear-changing relay 3, and effected over the then contact pair $g/k$ of the latter, as well as over the closed central contact pair 365/366 and 367/368 on switch solenoids W and V energization of change-over relay 6 which remains in this position up to the end of the shifting operation because it is self-locking. As a result the pull-in relay 14 is connected to mass over the then closed contact pair $g/n$ of the latter, it will pull, and over its contact pair $b/c$ the line connection 351 for the first gear pull-in coil in the switch solenoid will be energized and the first gear will be engaged. If that gear is completely engaged the nose on shaft 355 will open the end position disconnection switch of the first gear and line 381 will be separated from mass. This will cause the coil connection $z$ of the first gear pre-relay 12 to lose its connection to mass and it will loosen, similarly all the other previously energized relays will loosen and the shifting operation is completed. It should be noted that as long as engine M runs at idling speed the idling relay 1 will be continuously in working position.

When first gear is engaged the first gear location relay 13 will be in working position because the associated line connection 371 on switch solenoid W will then be connected to mass. The first gear holding coil in switch solenoid W will then be energized through the closed contact pair $f/p$ of relay 13 and line connection 361 and will keep first gear rigidly engaged. The signal lamp 391 for first gear will also light up.

Changing-up according to FIG. 9 proceeds as follows: If gas pedal position and engine speed are such that contacts 180 and 181 of initiator A connect, as shown in FIG. 7, changing-up is initiated. Contact 180 will then be energized by contact $d$ of gear-changing relay 3. The energy will then be further transmitted to contacts $h$ of location relays 13, 23, 33 when contact 181 is closed. With fully engaged first gear the first gear location relay 13 is energized and this current will be taken over contact pair $b/h$ to the second gear pre-relay 22, which pulls. Similar to the first gear the second gear main relay 21 as well as the gear-changing relay 3 and the work current relay 4 will also pull. The later will then transmit current over its now closed contact pair $b/c$ and the still closed contact pair $a/c$ of the still loose change-over relay 6 as well as over the still closed contact pair $g/r$ of the still closed first gear location relay 13 to the second gear pull-in coil over its line connection 352 on switch solenoid W, and the said pull-in coil will then pull first gear up to the centre, because the first gear location relay will drop and the current supply will stop. Disengagement of the first gear is made possible by the energization of gear-changing relay 3 and the resulting opening of contact pair $a/g$ of the latter, which de-energizes the holding coil of the first gear. If switch solenoid W does not succeed immediately in disengaging first gear because of a too high torque or engine M transmitted to the change-speed gear G, the relief relay 2, which in the meantime has been connected in series into the work current, will be energized and will short contact breaker U over its contact pair $b/c$, so that the ignition is interrupted and the switch solenoid W can disengage the gear step at the moment the load changes. If the latter is in central position line connection 365 connects with 366 and the change-over relay 6 will be energized so that similar to the process described in connection with the first gear energization of the second gear pull-in relay 24 will energize the line connection 332 to engage the second gear. The sliding sleeve 335 in change-speed gear D will press toward the left, but cannot yet fully engage the gear step because of the blocked synchronization in gear G.

The adjustment of the engine speed now proceeds as follows: Line connection 165 of the line from contact breaker U to ignition coil $z$ is connected to mass over the closed contact pair $a/b$ of the relieved idling relay 1 and the closed contact pair $d/j$ of the energized change-over relay 6, as well as the closed contact pair $b/d$ of the energized second gear main relay 21 and over the closed contact pair 29 on parallel gear P because of the position of contact finger 152 at right-hand end position, so that the ignition will be interrupted and engine M will immediately reduce its speed until the engine speed is low enough to permit engagement of the second gear, and until because of the uniform speed the synchronization of sliding sleeve 335 opens the path for engaging and the second gear is engaged. If the sliding sleeve 335 does not succeed entirely, and the reason would be that though the not designated synchronizing ring begins to act the claws will not fully engage, the switch solenoid W will be de-energized because of the beginning effect of the bimetal blinker 8 and the power for engaging the gear step will be gone. The then beginning relative movement between the threaded shaft 108 and gear wheel 132 in parallel gear P will move contact finger 152 toward the left and the resulting opening and closing of contact pair 29, together with the corresponding switching-on and off of the ignition will regulate engine speed exactly to the point where as a result of the closing of bimetal blinker 8 power will again be available and second gear will be engaged safely. An added safety factor, as shown in section Q—Q is obtained by using very smooth damping springs 395 in the centrifugal clutch KF. The gear-changing action ends similarly as in first gear by the opening of end position disconnection switch 382 on switch solenoid W. Changing-up from second into third gear follow the same procedure. It makes no difference that for this purpose switch solenoid W is used for disengagement and switch solenoid V for engagement of the gear step, because both operations are kept apart from each other by the energization of change-over relay 6. Changing-up from third into fourth gear is done in the same manner.

Initiation of changing-down shown in FIG. 9: The first opportunity for initiating the changing-down operation is, as shown in FIG. 8, that contact pair 180/182 in initiator A will meet, which energizes the fixed work contacts L of location relays 43, 33, 23 for fourth, third and second gear, with the energy arriving over the moving contact $d$ of the respectively energized location relay 43, 33 or 23 and so on to the next lower pre-relay 32, 22 or 12.

The second opportunity for initiating changing-down is when because of too much slip of the centrifugal clutch KF or when the vehicle is coasting contact fingers 153, 152, 151 for third, second or first gear on parallel gear P, which are normally at left when a higher gear is engaged, will move during this abnormal driving condition, as already described in FIG. 4, toward the right. Since one contact of each contact pair 18, 28, 38 is normally, when no gear shifting takes place, always energized, this energy will be transmitted when closing contact pair 38 and fourth gear is engaged over the then closed contact pair $m/d$ of the then energized fourth gear location relay 43 of the third gear pre-relay 32, and the gear-changing action will be initiated. In a similar method the current available by closing contact pair 28 will be transmitted to second gear pre-relay, with the third gear engaged, over the closed contact pair $m/d$ of the then energized third gear location relay 33, but also with engaged fourth gear over the then closed contact pair $c/j$ of the energized fourth gear location relay 43. The current available by closing contact pair 18 can then be transmitted directly to the first gear pre-relay. While the transmission of current to the one contact of contact pair 18 for first gear is effected directly by relay 3, it is effected to contact pairs 28 and 38 for second and third gear by contact c of the gear-changing relay 3 over contact pair 305/306 on gas linkage 301. Since the last-named contact pair is open when the gas pedal is not under load, no shifting-down process into third gear can be effected during the coasting of the vehicle, and the gears are shifted directly into first gear. If, during the coasting of the vehicle and prior to changing to first gear, the engine is accelerated it may happen that with fourth gear engaged the gear-changing operation into third gear and second gear may be initiated simultaneously. But only second gear will be accepted, because the second gear pre-relay 22 takes from third gear pre-relay 32 the current it needs for self-locking, and because following the energization of relays 21 and 3 there will also be no initiating current.

The third possibility to initiate changing-down is by manual operation. If hand shift stick H is moved from the position designated d in FIG. 9 with the Roman figures I, II, III, IV manually into the positions Roman I, II, III, the following will happen with fourth gear in position: Nose 331 projecting into the cutout of lever 323 will disengage fourth gear over switch rod 327, switch lever 334 and switch sleeve 326. Since in switch solenoid V the power of the holding coil, with line connection 364 for fourth gear, opposes this movement, it is de-energized because of the energization of hand relay 5 which occurs because of mass contact of contact pair 311/312 of hand shift stick H, and the resulting opening of contact pair a/b of the same, so that fourth gear can be disengaged. But the fourth gear location relay 43 remains nevertheless in its working position, since because of the mass contact of contact pair p/f which is connected with its coil, which receives mass from the still closed contact pair f/j and the still loose gear-changing relay 3, it is self-locking. When the hand shift stick arrives at position Roman numbers I, II, III it will connect line connections 313 and 315 with each other, in addition line connections 319 and 321 are separated and a later changing-up into fourth gear in this position of hand shift lever H is prevented. Line connection 315 is energized by contact b of the still loose gear-changing relay 3. This energy is then transmitted over line connection 313 and the closed contact pair k/d of the still closed fourth gear location relay 43 to the third gear pre-relay 31, and the respective changing-down operation is initiated. When third gear is engaged and hand shift stick H is moved into position Roman I, II, connection of line 314 and 315 will initiate in a similar manner the changing-down operation into second gear, and will prevent a later changing-up into third gear by separating line connection 320 and 321.

No provision is made for "changing-down manually" from second into first gear when the car is running, in view of the parking procedure, described further below. The driver cannot engage this gear-changing action unintentionally, because the effect of the holding coil for second gear will not stop when hand shift stick H is moved.

Shifting-down as shown in FIG. 9 is controlled similar to the shifting-up operation. Since the engine, after disengagement of the respective gear step with throttle flap 302 open is not under load, speed will immediately increase, as required for the said gear-shifting operation. Once the speed required for shifting the respective gear step is sufficiently high the engine cannot run still faster, because any increasing speed would move the respective contact finger 153, 152 or 151 for the third, second or first gear to be engaged to move toward the right, in which case the closing of the respective contact pair 39, 29 or 19 would cut-out the ignition.

When changing-down by hand to use engine M as engine brake the engine must be slightly accelerated until the gear jumps-in. When changing-down automatically this is of course not required because a gear-change is initiated only when accelerating.

Neutral, reverse, parking as shown in FIG. 9: The shape of gear shift stick 323 in combination with noses 331, 329 and 328 is a mechanical guarantee that in neutral position N of hand shift lever H all the gears are actually in neutral.

Engagement of the reverse gear is done mechanically by moving hand shift stick H into position R. Swiveling of stick 323 will cause nose 328 to slide switch rod 325 longitudinally, and switch fork 332 will engage the respective gear by means of the reversing wheel, not shown here.

Protection during parking against unvoluntary movement of the wheels is effected by engine M over freewheeling member F. When parking uphill, indicated by the letter P and an arrow pointing upward, it is required to engage the reverse gear, when parking downhill, first gear should be engaged. To permit the latter also mechanically, movement of the hand shift stick H into position Roman I or P, respectively, with the arrow pointing downwards, will engage first gear as the result of the movement of gear shift stick 323 and nose 330.

Figure 10B:
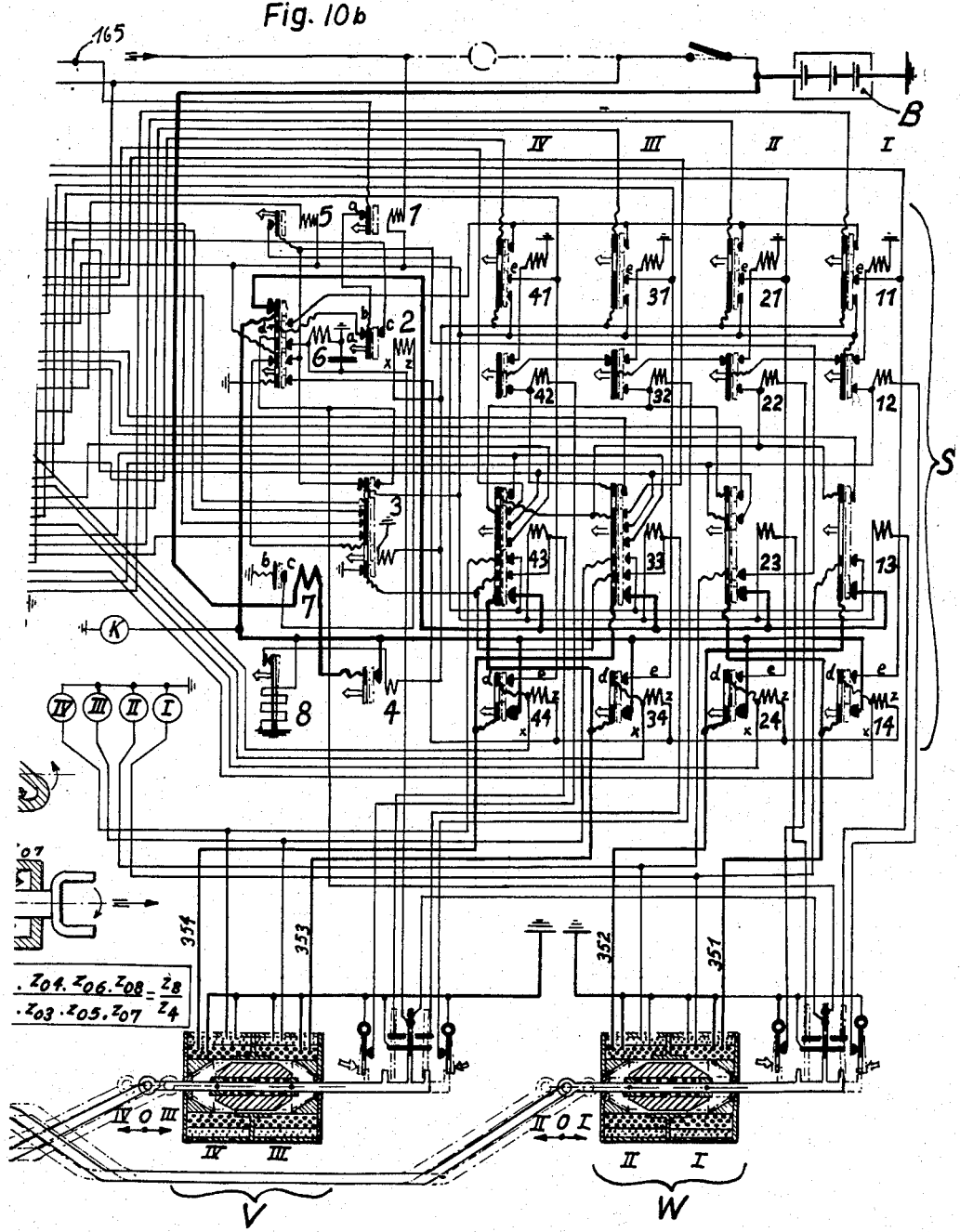
FIG. 10 (10a and 10b) shows a complete arrangement for a non-synchronized four-speed gear with centrifugal clutch.

FIGURE 10 shows a complete arrangement for a non-synchronized four-speed gear system with centrifugal clutch. The arrangement is described only where it differs from FIG. 9.

Change-speed gear G has two slide wheels 401 and 402, the latter is provided with claws to engage the fourth, direct gear step. Obviously, all gears may be provided with claws, if desired. Parallel gear P is additionally provided for first, second, third and fourth gear with one contact pair 17, 27, 37 and 47 each, which with the exception of 17 are closed only when contact fingers 152, 153 and 159 are in central position, as shown in FIG. 1. In addition, the ring grooves of gear wheels 131, 132, 133, 134 are, as shown in FIG. 3, arranged at an angle, to facilitate engagement of the gears.

In programme control device S the pull-in relays 14, 24, 34, 44 have in addition one moving contact d each, which is connected with coil connection x of the same relay, and a fixed work contact e, which is respectively connected with the fixed work contact e of the associated main relay 11, 21, 31 or 41. The last-named contact e of main relays 11, 21, 31, 41 are not, as shown in FIG. 9, directly connected with line connection x of the associated pull-in relay, but over contact pairs 17, 27, 37, 47 on parallel gear P, as soon as the said contacts are closed. Since contact finger 151, 152, 153 or 154 which the contact pair might close, will be in the drawn right-hand end position when changing the respective gear step up, and in left-hand end position when changing down, the respective pull-in relay 14, 24, 34 or 44 can only pull when the engine speed has dropped or risen, respectively, to the point, where the respective contact finger 151, 152, 153 or 154 begins to move toward the middle and the respective contact pair 17, 27, 37 and 47 closes. Once the respective pull-in relay is closed, it will remain closed until the end of the gear-shifting process because of the self-locking action imposed by its contact pair d/e.

To permit engagement of first gear when the vehicle is at a standstill, contact pair 17 is also closed with contact finger 151 in right-hand end position. This gear-changing arrangement may also be available with synchronized gears G to protect the synchronizing mechanism.

A further difference with regard to FIG. 9 is here the arrangement of the relief relay 2. As described in more details further down, this relay is arranged in such a manner that it will always pull whenever current flows to the pull-in coils 351, 352, 353 or 354, for the purpose of disengaging or engaging a gear step. With regard to disengaging a gear step it operates as shown in FIG. 9.

The line which permits shorting the ignition to adjust engine speed to the new gear step, leads in FIG. 9 directly from contact a of the idling relay to contact d of the change-over relay 6. Here, however, the relief relay 2 is provided with an additional rest contact $a$, and the said line leads over its contact pair $a/b$ which is closed when relief relay 2 is loose. Because of this arrangement the adjustment of engine M by parallel gear P during the shifting of the respective gear step will cease, which is of advantage, because from the time, when the teeth of the change-speed gears G during the shifting action begin to mesh, parallel gear P can no longer meet its task with regard to adjusting engine speed. If the teeth of the change-speed gear G prior to complete engagement of the respective gear step are still pressed against each other by the effect of the engine torque, preventing thereby full engagement of the gear step, the ignition is shorted for a moment over contact pair $b/c$ of relief relay 2 and the closed load-change switch 395, so that change-speed gear G is relieved from the imposed torque load and the respective gear step may be fully engaged.

To keep parallel gear P during the engagement of a gear step effective until the gears of change-speed gear G are in mesh the relief relay 2 is controlled by a delaying relay 7. The latter is provided with a coil having a thick, short winding, which is connected in series in the feed line of the working current and operates both during the disengaging and the engaging of the respective speeds. A moving contact $b$ of the coil is connected to mass and a fixed work contact $c$ of the same is connected with one connection $x$ of the coil of the relief relay 2, while the other connection $x$ of the latter is energized during the entire gear-changing operation. During the disengaging procedure, and particularly during the engaging of the respective speed, the beginning of the effect of relief valve 2 is therefore delayed by the period required by the delaying relay 7 to start pulling.

Figure 11B:
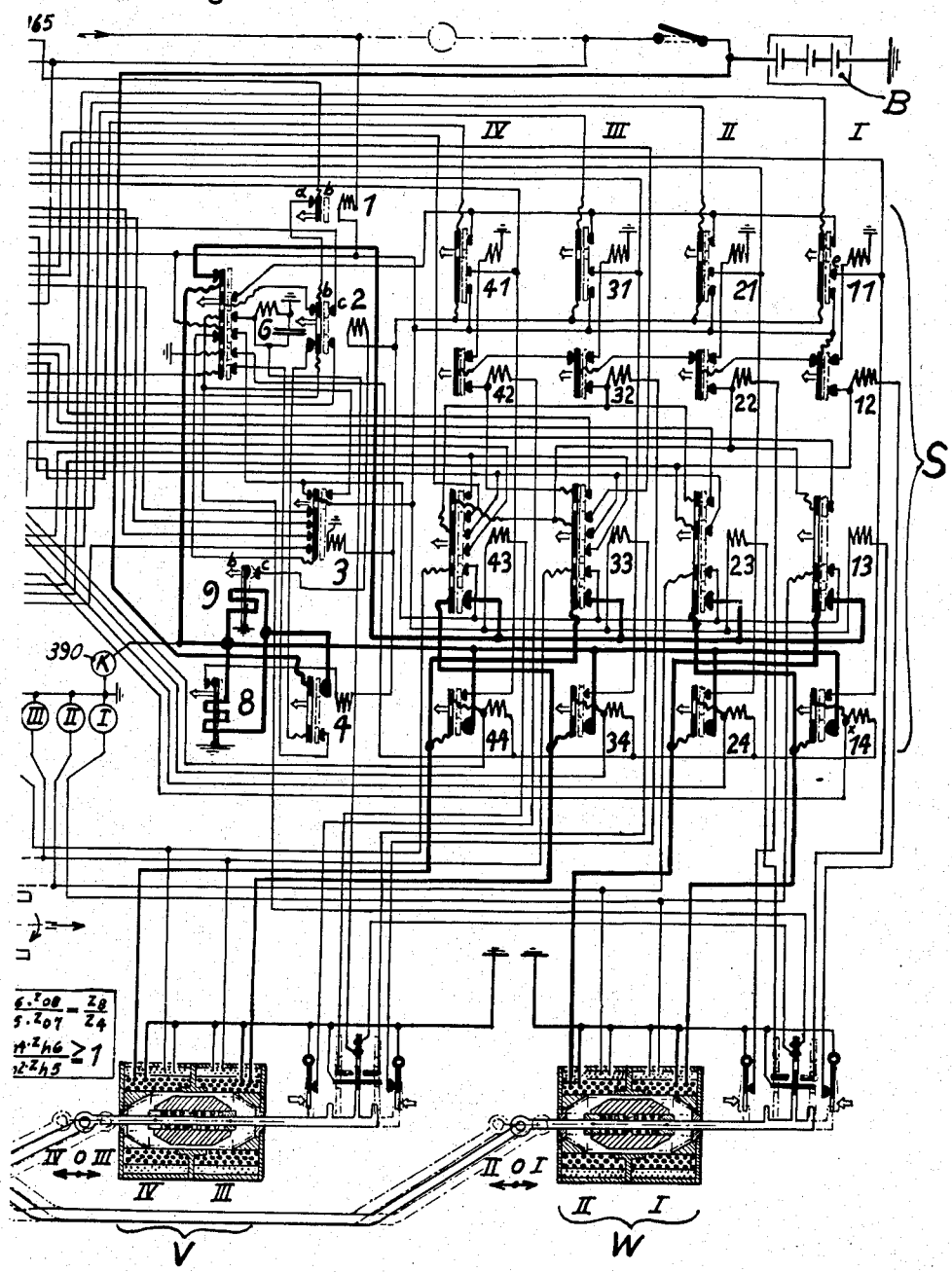
FIG. 11 (11a and 11b) shows a complete arrangement with hydraulic clutch and a four-speed gear synchronized in first forward speed only, but also synchronized in reverse, with revving device and device for preventing "creeping," and device for completely fool-proof driving.

FIGURE 11 shows a complete system with hydraulic clutch and a four-speed gear synchronized only in the first forward speed and in the reverse speed; with revving-up device and a device to eliminate "creeping," and a device for completely fool-proof driving. The system is described only to the point where it deviates from FIG. 9.

The main difference compared with FIG. 9 is that instead of a centrifugal clutch a hydraulic clutch KH is provided and that, as already shown in FIG. 5, parallel to this clutch an additional parallel gear PH is provided and operated.

The hydraulic coupling KH consists as usual of a pump impeller 440, attached to crankshaft 344. The housing comprises on the gear input shaft end 345 a turbine wheel 441 attached to the gear input shaft and carries at its right-hand, inner end a bevel gear wheel 442 having $z_{01}$ teeth, which rotates therefore at the speed of crankshaft 344. Attached to the gear input shaft 345 is a bevel gear wheel 443 having $z_{h6}$ teeth. The difference of the speeds of bevel gear 442 in relation to bevel gear wheel 443 is therefore the slip of the hydraulic clutch KH. The hydraulic clutch can also be additionally provided with the freewheeling device F, known in the art, if no parking lock has been provided, though a parking lock would be better.

The threaded shaft 108 of the parallel gear PH is extended and holds gear wheel 185 with gear teeth $z_{h1}$. Gear wheel 175 is threaded at its centre hole so that it can move between the 446 nuts 446, 447 on shaft 108. A swivelingly supported lever 448 enters into a ring groove of gear wheel 175 and carries at its upper end the insulated contact finger 176. Shaft 450 (with longitudinal groove) carries a gear wheel 451 with teeth $z_{h2}$, which will rotate after a given friction torque has been overcome and is permanently in mesh with gear wheel 175. The grooved shaft 450 is driven by gear input shaft 345 over intermediate shaft 453 and bevel gears with tooth numbers $z_{h3}$, $z_{h4}$, $z_{h5}$ and $z_{h6}$. The total transmission ratio of the bevel gears and spur gears in relation to the number of teeth, beginning with bevel gears 422 with $z_{01}$ over $z_{02}$, $z_{03}$, $z_{04}$, $z_{h1}$, $z_{h2}$, $z_{h3}$, $z_{h4}$, $z_{h5}$ and bevel gear 443 with $z_{h6}$ is equal to 1, so that for pull the contact finger 176 is at right and closes a contact pair 09, while for push it is at left and closes a contact pair 06. These contact pairs correspond to contact pairs previously described and are similar to those of the already described parallel gear P with final numerals 6 and 9. If the hydraulic clutch KH is provided with a freewheeling member F, no slip is possible during push. Therefore the total transmission ratio of the named bevel and spur gear is then not 1, but slightly higher than 1 so that contact finger 449 will remain in centre position at a slide slip during pulling operations and will move toward the left already during uniform rotation and enter a push position, so that push contact 06 is already closed when pump wheel 449 and turbine impeller 441 are running synchronized. Another method is that the freewheeling member F is driven over a reduction gear, so that it can operate under push only after a given slip.

In addition, to delay the effect of relief relay 2, relay 7 is not employed, but instead a delaying bimetal strip 9, whose ohmic resistance, which might under certain circumstances be the bimetal strip itself, conducts the working current so that shortly after the beginning of the disengaging or engaging operation of a gear step the heating of bimetal strip 9 will cause the contact $b/c$ to touch, by which means the relief relay 2 is connected to mass and will pull. This will result in a somewhat longer delay than with delaying relay 7 which is required in consideration of the larger switch path in gear G when first gear is synchronized. It should be noted, that the delaying bimetal strip 9 works of course much faster than the bimetal blinker 8.

Contrary to the earlier described resistance the bimetal blinker 8 has an ohmic resistance of short, thick wire and is connected in series into the feed line of the work current for disengaging or engaging the gear steps, to keep the signal lamp 390 from blinking when the vehicle is stopped, while because of a device for the "prevention of creeping" described further below the first gear is not engaged.

Disengaging and engaging during push and revving-up as shown in FIG. 11 is the same as in previous illustrations, except that FIG. 11 shows contact pairs 09 and 06, which respond to pull and push to the opposite relative movement inside the hydraulic clutch KH. This results in a still higher accuracy during automatic acceleration.

The device for the prevention of "creeping" when using hydraulic clutches as shown in FIG. 11 consists of the following components: Rod 411 of the gas linkage is provided with a second nose. This nose opens also in the idling position of gas pedal L an additional, second, normally closed switch with a fixed contact 505 and a moving contact 506. In programme control device S the connection of contact $e$ of the first gear main relay 11 runs not only over contact pair 17 in parallel gear P to coil connection $x$ of the first gear pull-in relay 14, but also in series over the said switch with the connections 505 and 506. Since at the end of a drive during the final coasting movements of the vehicle this switch is open, the coil of the first gear pull-in relay 14 is not energized in spite of the switching action in first gear, and first gear is not engaged, so that the car stops, while because of the disengagement of the previously engaged gear step no gear step is engaged and the car therefore cannot "creep" because no torque can be transmitted from change-speed gear G. The fact that no gear is engaged the first gear is more or less "pre-set" is reported to the driver by the lighting of signal lamp 390, where it will not blink because of the series-connection of the bi-metal blinker 8.

Only when the driver upon starting begins to accelerate thereby closing contact pair 505/506, will the first gear pull-in relay 14 be energized, it will pull and first gear will engage. If during the shifting operation because of acceleration the engine speed will rise slightly above idling speed, the previously pulled idling relay 1 will be loosened, its rest contact $a/b$ will be closed and the ignition switched-off, because the line connection 165 between contact breaker U and ignition coil Z over the named closed contact pair *a/b* of the loose idling relay 1 is connected to mass over the closed contact pair *b/c* of the pulled relief relay 2 and in addition over the closed contact pair 09 on parallel gear PH, so that in spite of acceleration the engine speed will not increase during the duration of the shifting operation for engaging first gear, all of which guarantees that first gear is securely engaged.

This device may also be provided in another type with hydraulic clutch or torque converter.

*Prevention of senseless changing-down by hand and of overspeeding of engine when changing-down manually*

The equipment shown in FIG. 11 for the above purpose comprises the following components: A speedometer 459 is provided with a moving contact finger 460 and 2 fixed contacts 461 and 462, it is attached and driven by engine M just like the initiating device A. In rest position the moving contact finger 460 rests against contact 462 and stays there up to an engine speed at which "changing-down by hand" is still permissible. If engine M exceeds that speed the moving contact finger 460 moves off and toward the left. When the speed of engine M reaches the maximum permissible engine speed the said contact finger 460 will touch contact 461. Hand shift lever H has on section 433 another 2 unsymmetrical locking positions, that is a total of five. In addition to the already installed thrust solenoid 434 for the prevention of changing-down there is another thrust solenoid 465 whose armature is held by a compression spring 464 in the position shown on the drawing, with the armature actuating a lock 466 pivotably attached to the armature and held by compression spring 467 in the position shown. There is one feed line 468, while the other feed line is connected to mass. In addition the armature is provided with an end position disconnection switch 469, which is normally closed with a contact rigidly connected to mass, while the switch is opened when the armature is completely energized.

In the main switch on hand shift stick H are in addition the fixed contact strip 470 and the fixed contacts 472, 473 and 474. In the arm 312 of the main switch are an additional moving contact strip, which connects the contacts in the respective positions of the hand shift stick H.

Two additional relays 476 and 477 are provided. Relay 476 has a fixed rest contact *a*, the moving contacts *b* and *c* as well as the fixed contact *d*. The relay 477 is provided with the moving contact *b* and the fixed work contacts *c*, *d*, *e*, of which the latter is connected with one end of the coil.

This arrangement operates as follows: Contact 474, 473 or 472 are energized, when the fourth, third or second gear is engaged. Since in the position of the hand shift stick H Roman I, II, III, IV, Roman I, II, III or Roman I, II, they are respectively connected with contact strip 470, and this contact strip in turn is connected by means of a line with the moving contact finger 460 and contact *b* of relay 476, the result is that the latter will be energized when the highest speed possible at the respective position of hand shift stick H is actually engaged. However within the speed range of the engine, in which the changing-back is permissible this energy cannot effect energization of thrust solenoid 434, whose feed line 436 is connected to the latter contact *a*, over the rest contact pair *a/b* of relay 476, because due to the touching of contacts 460 and 462 the coil of relay 476 will be energized and is therefore pulled, which means that contacts *a/b* are separated. Only when engine speed is higher as permissible for changing-down and as described, contacts 460 and 462 of speedometer 459 open so that relay 476 loosens, will thrust solenoid 434 pull and thus prevent manual changing-down by a respective interlocking of hand shift stick H.

If the engine speed continues to rise and overspeeding of the engine may be expected contacts 460 and 461 will touch and relay 477 will pull. The moving contact *b* of relay 477 is constantly energized. If its contact *e* touches contact *b* it becomes self-locking. By touching contact *d* relay 476 will pull so that the power of the thrust solenoid 434 stops. Thrust solenoid 465 receives now over its feed line 468 current by means of the closed contact pair *b/c* of relay 477 and the then also closed contact pair *c/d* of the now energized relay 476. Thrust solenoid 465 will pull and move by means of lock 466 hand shift stick H into the next higher selective position, so that then as usual the next higher gear step can be engaged automatically. By opening the end position disconnection switch 469 the movement of hand shift stick H is ended and relay and thrust solenoid 465 are loosened.

This arrangement does not work in position Roman I, but if required provisions may be made for extension.

This device may also be provided for the other arrangements, but may also be omitted without obstructing the operation of the remaining components, for this reason it is shown on the drawing in a dotted line.

Figure 12B:
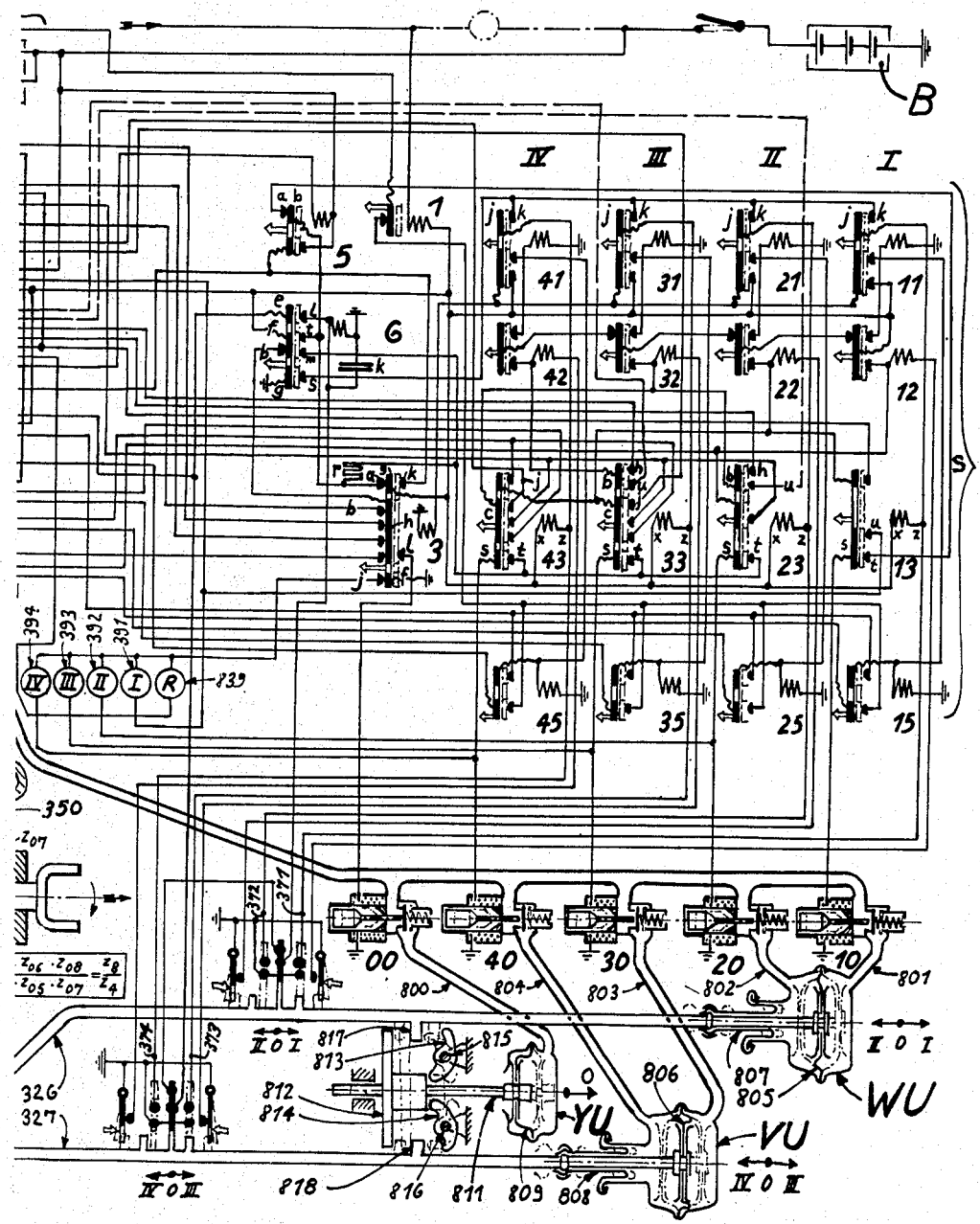
FIG. 12 (12a and 12b) shows a complete arrangement with centrifugal clutch, automatic separating clutch with servo device and four-speed gear, whose forward speeds are synchronized, in which the engine underpressure is used as servo power to shift the gears, as well as a device for absolutely fool-proof driving.

FIGURE 12 shows a complete system with centrifugal clutch, automatic separating clutch with servo device and four-speed gear, of which the forward speeds are synchronized and the servo power used for shifting gears is the underpressure of the engine, also included is a device for absolutely fool-proof driving.

The construction of the automatic control of the automatic clutch KA, as well as the adjustment of engine M up to almost complete engagement of the respective gear steps and a large number of other components have already been described before, among others in FIG. 9. For this reason construction and operation of the arrangement is described only to the point, where new components are involved. New items are the use of underpressure instead of electricity as servo power for shifting the gears, the fool-proof design of the arrangement of the design similar to FIG. 11 but operating passively, and the lights indicating the respective gear position.

It should be noted that the intermediate shafts 349 and 350 in this case may also be flexible shafts stiff against torsion, because their main purpose is to eliminate any excessive delay of rotation during slow speeds during the initiation of the shifting-down operation through parallel gear P.

Underpressure as servo power for gear-shifting as shown in FIG. 12 is used and controlled as follows: Two switch servos WU and VU, which operate with underpressure are connected with the switching rods 326 and 327. The two switch servos WU and VU have a moving diaphragm 805 and 806 each, which are in the centre position shown in the drawing when no gear step is engaged. If the right-hand or the left-hand end of the respective diaphragm 805 or 806 is subjected to underpressure over a pipe line 801, 802, 803 or 804, the diaphragm will move toward the right or to the left, and will engage the respective gear. The movements of switch rod 326 and 327 is made possible by a moving bellows 807 or 808 each, which seals the left end of the respective switch servos WU or VU.

In addition there is a switch servo YU, whose diaphragm is normally located as shown at left on the drawing and will move toward the right when subjected to underpressure through pipe line 800. In the process a longitudinally movable rod 811 is carried along, to which a dog 812 is attached. Two levers 813 and 814 are pivotably mounted on the fixed pivot pins 815, 816. Switch rods 326 and 327 have one nose 817, 818 each, so that when the pipe lines 800 are subjected to underpressure an engaged forward speed will be disengaged and all forward speeds will be held in central position.

These are five solenoid valves 10, 20, 30, 40 and 00 provided, which, when opened, transmit the underpressure of pipe line 705 to the switch servos WU, VU, YU. Energization of solenoid valves 10, 20, 30 or 40 therefore effect the engagement of first, second, third or fourth gear, while energization of solenoid valve 00 effects the disengagement of all gears into centre zero position. A vacuum tank of known type may be installed between pipe line 705 and intake pipe 708 of driving engine.

The programme control device S operates as follows: If a gear step is engaged during operation of the vehicle the coil connection z of location relay 13, 23, 33 or 43, similar to the other arrangements according to the invention, is connected to mass over contact 371, 372, 373 or 374, and the location relay of the respective gear step is energized. Over a closed contact pair s/t of this energized location relay 13, 23, 33 or 43 the respective solenoid valve 10, 20, 30 or 40 will be energized and the respective gear step is held constantly engaged by underpressure. Energization of contacts t of location relays 13, 23, 33 and 34 is effected by means of a line from contact a of the gear-changing relay 3, in the second, third and fourth gear this energization is effected over an ohmic resistance at a reduced constant value. If a gear-shifting operation is initiated gear-changing relay 3 will be energized. This will open the previously closed contact pair a/g and energization of solenoid valves 10, 20, 30 or 40 is interrupted. As a result the respective gear is no longer kept engaged. If the gear-changing relay 3 has pulled, contact h, which is still energized, will touch a fixed work contact L which leads current to solenoid valve 00, so that switch servo YU will disengage the respective gear. When this has been done, change-over relay 6 will, as already described, begin to pull and the previously closed contact pair b/f will be opened and the disengaging operation ended. Since contact pairs b/m and b/t as well as g/s of the change-over relay are closed and will remain closed up to the end of the gear-changing operation because of the effect of e/l, the following will happen: Main relays 11, 21, 31, and 41 are provided with a moving contact j and a fixed working contact k, which are closed when the main relay is energized. From contact s of change-over relay 6, which has pulled up later, the coil connection z of the respective location relay 13, 23, 33 or 43 will be connected to mass over the closed contact pair j/k of the respective main relay 11, 21, 31 or 41, the relay will pull up and effect by the closing of its contact pair s/t because of the transmitted current from contact pair f/t or f/m, which are hereby closed, of the pulled up change-over relay 6 the transmission of current to the respective solenoid valves 10, 20, 30 or 40, so that the respective gear is engaged by underpressure. When the gear step is engaged the respective contact 371, 372, 373 or 374, which is then connected to mass, acts as mass connection of coil connection z of location relay 13, 23, 33 or 43, so that the latter is constantly pulled up, while the then released gear-change relay 3 accepts over its then closed contact pair a/g the transmission of current to the respective solenoid valve 10, 20, 30 or 40, so that the respective gear step remains engaged, while because of the action of the ohmic resistance r on relay 3 the then continuously flowing current is reduced to the extent that it will just be sufficient to keep solenoid valve 20, 30 or 40 open, in order to prevent overheating of the latter.

If instead of air pressure oil pressure is used for the switch servos, control may be effected the same way; because of the reduced compressibility of the liquid medium, switch servo YU may be dispensed with, while the disengagement of a gear step is basically effected similar to the operation of switch solenoids W and V in the previous illustrations. Under favorable conditions pneumatically operated switch servos may of cause also dispense with switch servo YU.

*Prevention of gear-shifting operations as the result of senseless changing-down by hand—changing-up when engine threatens to overspeed as the result of changing-back by hand*

In FIG. 12 the arrangement for this purpose consists among others of the speedometer 459 already shown in FIG. 11, whose contact pair 460/461 closes at the max. permissible engine speed, while contact pair 460/462 is closed in the speed range, within which changing-down by hand is permissible.

In the selector switch on hand shift stick H are in addition to contacts 319, 320, 321, which with respect to connection and effect correspond to those shown in FIGS. 9 to 11, also contacts or contact strips 820, 822, 823, as well as 830, 832, 833. On the location relays 33 and 23 of third and second gear are opposite the already attached moving contact b in addition one fixed working contact u each, connected with contact 833 or 832, respectively. In addition contact 823 or 822, respectively, is connected with the respective contact j of location relay 43 or 33 and contact 460 with contact b of gear-changing relay 3. In addition 461 is connected with 830 and 462 with 820. If in operating condition the hand shift stick H is in position Roman I, II, III, IV, all engagements are made in dependence of gas pedal position and driving speed, as shown. If then the driver switches to position Roman I, II, III and if the speed for changing-down is too high, nothing will happen, because contact pair 460/462 of speedometer 459 is open. Only when speed becomes so low that these contacts meet will changing-down to third speed be initiated, independent of the gas pedal position, at the maximum permissible speed. The current will then flow beginning at contact H of the gear-changing relay 3 over contact pair b/h, contact pair 460/462, contact pair 820/823 and over contact pair j/c of the pulled-up fourth speed location relay 43 to the coil of the third speed pre-relay 32. The same happens when the hand shift stick is moved into position Roman I, II. If this is done at high speed from Roman I, II, III, IV, with fourth speed engaged, shifting will take place depending on the speed of the vehicle immediately, or after speed has dropped, into third speed and after further dropping speed into second speed, and only at maximum engine speed, with the device (not shown) on the servo mechanism of the automatic separating clutch KT effecting smooth engagement because the gas pedal L is not under load.

In position Roman I, II, III or Roman I, II, changing-up into fourth, or fourth or third gear, initiated by the initiating device A as the result of the opening of contact pairs 321/319 or 321/320, is blocked. If in such a case the engine speed increases to the point where a danger of overspeeding arises, closing of contact pair 460/461 of the speedometer 459 will nevertheless initiate the changing-up procedure over 830/832 or 830/833 and u/b of location relay 23 or 33 into third or fourth gear. If following the changing-up operation the speed drops again, there will be an immediate changing-down.

"Shifting by hand" while driving in first gear has not been provided for and because of the shape of the gear shift stick 424 it is not possible either, as long as second, third or fourth gear are engaged.

This device may also be provided for in the other arrangements according to the present invention, but since it is not absolutely required and may be omitted together with speedometer 479 it is shown on the drawings in dotted lines.

*Gear-change indicating lights*

In FIGS. 9, 10 and 11, the gear-change indicating lights 391, 392, 393 and 394 will light-up only when because of the position of hand shift stick H no definite gear step is engaged here. In FIG. 12 however, they will light-up when any one of the gear steps has been engaged. This is done by the additional contacts 840 and 841 on the selector switch, which with hand shift stick H in position R and Roman I received current from the extended contact strip 316 and transmit this current to an additional indicating lamp 839 for reverse gear or the indicating lamp 391 for first gear. To prevent any obstruction by the last named current, the required energy is taken to lamp 391 during other operating conditions over an additional fixed work contact u on the first gear location relay 13.

To obtain that the lights will light up only when the engagement of a respective gear speed has been fully completed, the mass connection of the gear-change indicating lamps 391, 392, 393, 394 and 839 will be effected over contact pair j/f of gear-changing relay 3 which will be closed only when relay 3 is open.

Having thus fully disclosed my invention, what I claim is:

1. In an arrangement for automatically controlling, particularly in an automatic transmission of a motor vehicle, a sliding-gear type transmission having a driving input shaft and a driven output shaft arranged in the power train of a prime mover, in combination, automatic electric control means for regulating the rotary speed of said driving input shaft, means controlled by said control means for causing the shifting of the gears of said transmission, speed ratio detector means operatively connected with the transmission for furnishing at the beginning of any shift operation in said transmission from any one gear ratio to another desired gear ratio, if the rotary speed of said input shaft is not the proper one for permitting engagement of the gears required for establishing said desired gear ratio, a first control signal to the automatic electric control means for causing the latter to regulate said rotary speed of said input shaft so as to establish said proper speed, and to furnish, when the rotary speed of said input shaft is substantially the proper one, a second control signal to said automatic control means for causing the latter to effect the shifting of said transmission to said desired gear ratio.

2. In an arrangement for automatically controlling, particularly in an automatic transmission of a motor vehicle, a sliding-gear type transmission having a driving input shaft and a driven output shaft arranged in the power train of a prime mover, in combination, automatic electric control means for regulating the rotary speed of said driving input shaft, means controlled by said control means for causing the shifting of the gears of said transmission, speed ratio detector means operatively connected with the transmission for furnishing at the beginning of any shift operation in said transmission from any one gear ratio to another desired gear ratio, if the rotary speed of said input shaft is too high for permitting engagement of the gears required for establishing said desired gear ratio, a first speed control signal to the automatic electric control means for causing the latter to decrease said rotary speed of said input shaft so as to establish said proper speed, while furnishing, if said speed of said input shaft is too low, a second speed control signal to said automatic electric control means for causing the latter to increase said rotary speed of said input shaft so as to establish the proper speed, and to furnish, when the rotary speed of said input shaft is substantially the proper one, a shift control signal to said automatic control means for causing the latter to effect the shifting of said transmission to said desired gear ratio.

3. In an arrangement for automatically controlling, particularly in an automatic transmission of a motor vehicle, a sliding-gear type transmission having a driving input shaft and a driven output shaft arranged in the power train of a prime mover, in combination, automatic electric control means for regulating the rotary speed of said driving input shaft, means controlled by said control means for causing the shifting of the gears of said transmission, speed ratio detector means operatively connected with the transmission and including electrical circuit means for furnishing at the beginning of any shift operation in said transmission from any one gear ratio to another desired gear ratio, if the rotary speed of said input shaft is too high for permitting engagement of the gears required for establishing said desired gear ratio, a first speed control signal to the automatic electric control means for causing the latter to decrease said rotary speed of said input shaft so as to establish said proper speed, while furnishing, if said speed of said input shaft is too low, a second speed control signal to said automatic electric control means for causing the latter to increase said rotary speed of said input shaft so as to establish the proper speed, and to furnish, when the rotary speed of said input shaft is substantially the proper one, a shift control signal to said automatic control means for causing the latter to effect the shifting of said transmission to said desired gear ratio.

4. In an arrangement for automatically controlling, particularly in an automatic transmission of a motor vehicle, a sliding-gear type transmission having a driving input shaft and a driven output shaft arranged in the power train of a prime mover, in combination, automatic electric control means for regulating the rotary speed of said driving input shaft, means controlled by said control means for causing the shifting of the gears of said transmission, speed ratio detector means including auxiliary transmission means operatively connected in parallel with the sliding-gear type transmission, said auxiliary transmission means comprising first shaft means driven by the driving input shaft at a speed proportional to that of the latter, and second shaft means driven by the driven output shaft at a speed equally proportional to that of the latter, a plurality of independently axially shiftable first gear means on said first shaft means and rotatable therewith, and a plurality of second gear means on said second shaft means and individually in frictional driving engagement therewith, said plurality of said first and second gear means being subdivided into meshing pairs of one of said first and one of said second gear means, the number of said pairs and the gear ratio of the different pairs being the same as the number of pairs of gears and their different gear ratios in said sliding-gear type transmission, said first gear means moving individually axially along said first shaft means between a middle position, an extreme position on one side and an extreme position on the other side of said middle position depending upon whether the rotary speed of said first shaft means is substantially equal to that of said second shaft means, higher and lower than the same, respectively, and including electrical circuit means controlled by said axially moving of said individual first gear means for furnishing at the beginning of any shift operation in said transmission from any one gear ratio to another desired gear ratio, if the rotary speed of said input shaft is not the proper one for permitting engagement of the gears required for establishing said desired gear ratio, a first control signal to the automatic electric control means for causing the latter to regulate said rotary speed of said input shaft so as to establish said proper speed, and to furnish, when the rotary speed of said input shaft is substantially the proper one, a second control signal to said automatic electrical control means for causing the latter to effect the shifting of said transmission to said desired gear ratio.

5. In an arrangement for automatically controlling, particularly in an automatic transmission of a motor vehicle, a sliding-gear type transmission having a driven input shaft and a driven output shaft arranged in the power train of a prime mover, in combination, automatic electric control means for regulating the rotary speed of said driving input shaft, means controlled by said control means for causing the shifting of the gears of said transmission, speed ratio detector means including auxiliary transmission means operatively connected in parallel with the sliding-gear type transmission, said auxiliary transmission means comprising first shaft means driven by the driving input shaft at a speed proportional to that of the latter, and second shaft means driven by the driven output shaft at a speed equally proportional to that of the latter, a plurality of independently axially shiftable first gear means on said first shaft means and rotatable therewith, and a plurality of second gear means on said second shaft means and individually in frictional driving engagement therewith, said plurality of said first and second gear means being subdivided into meshing pairs of one of said first and one of said second gear means, the number of said pairs and the gear ratio of the different pairs being the same as the number of pairs of gears and their different gear ratios in said sliding-gear type transmission, said first gear means moving individually axially along said first shaft means between a middle position, an extreme position on one side and an extreme position on the other side of said middle position depending upon whether the rotary speed of said first shaft means is substantially equal to that of said second shaft means, higher and lower than the same, respectively, and including electrical circuit means controlled by said axially moving of said individual first gear means for furnishing at the beginning of any shift operation in said transmission from any one gear ratio to another desired gear ratio, if the rotary speed of said input shaft is too high for permitting engagement of the gears required for establishing said desired gear ratio, a first speed control signal to the automatic electric control means for causing the latter to decrease said rotary speed of said input shaft so as to establish said proper speed, while furnishing, if said speed of said input shaft is too low, a second speed control signal to said automatic electric control means for causing the latter to increase said rotary speed of said input shaft so as to establish the proper speed, and to furnish, when the rotary speed of said input shaft is substantially the proper one, a shift control signal to said automatic control means for causing the latter to effect the shifting of said transmission to said desired gear ratio.

6. An arrangement as claimed in claim 5, wherein said electrical circuit means comprise a plurality of selector switch means, each being associated with and actuatable by a different one of said axially shiftable first gear means and being movable between a middle position, an extreme position on one side and an extreme position on the other side of said middle position in conformity with said different positions of the respectively associated one of said first gear means, for furnishing in each of said positions said shift control signal, said first speed control signal and said second speed control signal, respectively, by closing a respectively corresponding control circuit in said automatic electric control means.

7. An arrangement as claimed in claim 6, wherein the power train includes a slip clutch and wherein said auxiliary transmission means are operatively connected in parallel both with said sliding-gear type transmission and said slip clutch, said selector switch means being constructed to furnish a second shift control signal to said automatic electric control means when, while any one of the possible gear ratios except the highest thereof is established in said sliding-gear type transmission, the slip in said slip clutch is sufficiently large to permit a gear shift to the respectively higher gear ratio, so as to cause said automatic electric control means to effect such gear shift.

References Cited by the Examiner
UNITED STATES PATENTS

| | | | |
|---|---|---|---|
| 2,062,104 | 11/36 | Prince | 74—472 X |
| 2,235,943 | 3/41 | Mylius | 192—.092 X |
| 2,252,009 | 8/41 | Kenny | 74—472 X |
| 2,386,391 | 10/45 | Fike et al. | 74—472 X |
| 2,752,020 | 6/56 | Saives | 192—.092 |
| 2,943,502 | 7/60 | Perkins et al. | 74—339 |

DON A. WAITE, *Primary Examiner.*